United States Patent [19]

Tobita et al.

[11] Patent Number: 5,239,141
[45] Date of Patent: Aug. 24, 1993

[54] GROUP MANAGEMENT CONTROL METHOD AND APPARATUS FOR AN ELEVATOR SYSTEM

[75] Inventors: Toshimitsu Tobita; Atsuya Fujino, both of Hitachi; Hiromi Inaba, Katsuta; Kiyoshi Nakamura, Katsuta; Kenzi Yoneda, Katsuta; Takaaki Ueshima, Katsuta, all of Japan

[73] Assignee: Hitachi, Ltd., Tokyo, Japan

[21] Appl. No.: 539,696

[22] Filed: Jun. 14, 1990

[30] Foreign Application Priority Data

Jun. 14, 1989 [JP] Japan .................................. 1-149427

[51] Int. Cl.⁵ .............................................. B66B 1/20
[52] U.S. Cl. ..................................... 187/127; 187/124
[58] Field of Search ........................ 187/101, 124, 127

[56] References Cited

U.S. PATENT DOCUMENTS

| | | | |
|---|---|---|---|
| 4,509,143 | 4/1985 | Tajima et al. | 187/101 X |
| 4,690,243 | 9/1987 | Ichioka | 187/101 |
| 4,760,896 | 8/1988 | Yamaguchi | 187/124 |
| 4,947,965 | 8/1990 | Kuzunoki et al. | 187/127 |

FOREIGN PATENT DOCUMENTS 61-197378 9/1986 Japan .
62-46880 2/1987 Japan .

Primary Examiner—Steven L. Stephan
Assistant Examiner—Robert Nappi
Attorney, Agent, or Firm—Antonelli, Terry, Stout & Kraus

[57] ABSTRACT

In a group-management control apparatus for an elevator system with plural elevators capable of serving plural floors, hall calls are allotted to adaptive elevators in accordance with a predetermined hall call allotment algorithm, for the purpose of achieving desired control targets. Plural kinds of the hall call allotment algorithm with different schemes are provided in advance, and the predetermined hall call allotment algorithm is selected therefrom by a reasoning operation, which is executed in accordance with a reasoning rule selected from among a plurality of reasoning rules empirically provided in advance on the basis of the desired control targets and an operating state of the elevators.

10 Claims, 22 Drawing Sheets

FIG. 3a
OPERATION CONTROL DATA TABLE SF101

| ELEVATOR STATE (POSITION, DIRECTION, NUMBER OF PASSENGERS etc.) |
| --- |
| CAGE CALL REGISTRATION |
| ALLOTTED HALL CALL REGISTRATION |
| PREDICTIVE ARRIVAL TIME |
| TIME ELAPSED FROM REGISTRATION OF HALL CALL |
| WORK TABLE ($T, T_i, T_c, T_{max}, \Phi$, etc.,) |
| OTHERS |

FIG. 3b
HALL CALL REGISTRATION TABLE SF102

| HALL CALL REGISTRATION |
| --- |

FIG. 3c
ELEVATOR SYSTEM SPECIFICATION TABLE SF103

| NUMBER OF ELEVATORS |
| --- |
| NUMBER OF FLOORS OF BUILDING |
| FLOORS TO BE SERVED |
| BASE FLOOR (LOBBY FLOOR) |
| DISPERSIVE STAND-BY FLOORS |
| CAPACITIES |
| SPEED |
| OTHERS |

FIG. 4a

SAMPLING DATA TABLE SF202

| $C_{ij}$ (new) |
| $C_{ij}$ (old) |
| $t_r$ (new) |
| $t_s$ (new) |
| $t_r$ (old) |
| $t_s$ (old) |
| OTHERS |

FIG. 4b

SIMULATION DATA TABLE SF205

| $C_{ij}$ (pre) |
| $t_r$ (pre) |
| $t_s$ (pre) |
| OTHERS |

FIG. 4c

CHARACTERISTIC CURVE TABLE SF207

| DATA FOR A CHARACTERISTIC CURVE OF WAITING TIME |
| DATA FOR A CHARACTERISTIC CURVE OF RIDING TIME |
| DATA FOR A CHARACTERISTIC CURVE OF CAGE-LOAD FACTOR |
| DATA FOR A CHARACTERISTIC CURVE OF POWER CONSUMPTION |
| OTHERS |

FIG. 4d

REASONING TABLE SF212

| DATA BASE FOR REASONING |
| RULE BASE FOR REASONING |
| OTHERS |

FIG. 4e

CONTROL TARGET TABLE SF209

| TARGET VALUE FOR WAITING TIME |
| TARGET VALUE FOR RIDING TIME |
| TARGET VALUE FOR CAGE-LOAD FACTOR |
| TARGET VALUE FOR POWER SAVING |
| OTHERS |

FIG. 4f

ADAPTIVE OPERATION CONTROL PARAMETER TABLE SF210

| $\alpha$ |
| $A_s$ |
| $T_r$ |
| $T_s$ |
| PARAMETER FOR WAITING TIME |
| PARAMETER FOR RIDING TIME |
| THRESHOLD FOR CAGE-LOAD FACTOR |
| OTHERS |

FIG. 9

|   | DESTINATION FLOOR j | | | | | | | |
|---|---|---|---|---|---|---|---|---|
|   | 1 | 2 | 3 | 4 | 5 | 6 | 7 | 8 |
| 1 | \ | 3 | 2 | 4 | 5 | 3 | 2 | 5 |
| 2 | 4 | \ | 1 | 0 | 2 | 4 | 2 | 1 |
| 3 | 4 | 2 | \ | 0 | 1 | 3 | 2 | 2 |
| 4 | 3 | 1 | 1 | \ | 2 | 0 | 0 | 0 |
| 5 | 6 | 2 | 0 | 3 | \ | 2 | 3 | 2 |
| 6 | 2 | 3 | 2 | 0 | 2 | \ | 4 | 3 |
| 7 | 4 | 1 | 1 | 0 | 2 | 4 | \ | 3 |
| 8 | 5 | 2 | 2 | 0 | 1 | 3 | 2 | \ |

HALL CALL ORIGINATING FLOOR i (rows) — DEMAND FOR UPWARD TRAVEL (upper triangle) — DEMAND FOR DOWNWARD TRAVEL (lower triangle)

TABLE OF DESTINATION-TRAFFIC DEMAND $C_{ij}$

FIG. 15

| # | ITEMS AND THEIR VALUE | |
|---|---|---|
| 1 | PRESENT TRAFFIC DEMAND | 150pers./ 5min. |
| 2 | INCREMENT OF THE ABOVE | 30pers./ 5min. |
| 3 | TRAFFIC DEMAND BETWEEN FLOORS | 30pers./ 5min. |
| 4 | INCREMENT OF THE ABOVE | 5pers./ 5min. |
| 5 | DOWNWARD TRAFFIC DEMAND | 60pers./ 5min. |
| 6 | INCREMENT OF THE ABOVE | 10pers./ 5min. |
| n | SET VALUE OF WAITING TIME | 20sec. |
| n+1 | SIGNIFICANCE OF THE ABOVE | 0.3 |
| n+2 | SET VALUE OF RIDING TIME | 35sec. |
| n+3 | SIGNIFICANCE OF THE ABOVE | 0.2 |
| n+4 | SET VALUE OF CAGE-LOAD FACTOR | 20% |
| n+5 | SIGNIFICANCE OF THE ABOVE | 0.3 |

EXAMPLE OF DATA BASE TABLE OF REASONING TABLE

FIG. 16

| # | CONDITION PART | CONCLUSION |
|---|---|---|
| 1 | IF TRAFFIC DEMAND INCREASES AND CAGE-LOAD FACTOR IS STRESSED | THEN THRESHOLD OF CAGE-LOAD FACTOR IS MADE SMALL |
| 2 | IF TRAFFIC DEMAND BETWEEN FLOORS INCREASES AND RIDING TIME IS STRESSED | THEN PARAMETER OF RIDING TIME IS MADE LARGE |
| 3 | IF DOWNWARD TRAFFIC DEMAND IS LARGE AND CAGE-LOAD FACTOR IS STRESSED | THEN THRESHOLD OF CAGE-LOAD FACTOR IS DETERMINED AT FIRST |

EXAMPLE OF RULE BASE TABLE OF REASONING TABLE

FIG. 17

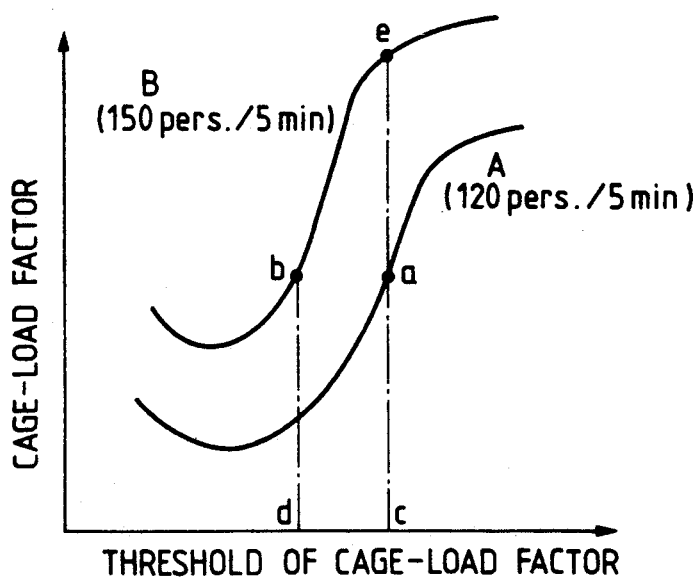

GROUP MANAGEMENT CONTROL METHOD AND APPARATUS FOR AN ELEVATOR SYSTEM

BACKGROUND OF THE INVENTION

1. Field of the Invention

The present invention relates to a group-management control method and apparatus for an elevator system with plural elevators capable of serving plural floors, and especially to a method and apparatus suited for meeting a variety of demands of users of such an elevator system.

2. Description of the Related Art

An elevator system, which is installed in a large building, is usually provided with plural elevators to serve plural floors of the building. In such an elevator system, the plural elevators are required to operate as a whole efficiently and economically in order to improve the service to users or to save the power consumption.

In a group-management control apparatus for such an elevator system, the generation of hall calls is monitored on an on-line basis and a hall call generated at a certain floor is allotted to an adaptive elevator, which is evaluated as being most suited for serving the floor, by taking account of the overall service condition for then existing hall calls, whereby waiting times of persons, who wait the arrival of available elevators in elevator halls of respective floors, can be shortened on an average.

That is to say, when a hall call is generated in a certain floor, it is evaluated which one of the plural elevators is most suitable to serve the certain floor, and the service to the floor is assigned to an elevator evaluated as the most suitable one. The aforesaid evaluation is carried out by calculating evaluation values of all of the group-controlled elevators with respect to the hall call in accordance with a predetermined evaluation function. An elevator, which has the most desired one, e.g., maximum or minimum, of the calculated evaluation values, is selected as an adaptive one to respond the hall call.

The aforesaid evaluation function includes evaluation indexes of some kinds of control items, such as a waiting time, a riding time, a cage-load factor and so on, as components to be considered for the group-control of the elevators. Such evaluation indexes are incorporated in the evaluation function with respective variable control parameters, which can be altered in accordance with a traffic demand for the elevator system. The values of the control parameters, which can satisfy desired targets of the control items under a certain traffic demand, are provided for every traffic demand in advance by the simulation carried out on an off-line basis.

In an actual daily service operation, the values of the control parameters are at first selected in response to a traffic demand at that time. Since a traffic demand is provided as various patterns for every time zone in a day, for example, the control parameters can be selected accordingly. Upon allotment of a hall call generated during the actual daily service operation, the aforesaid evaluation is carried out in accordance with the evaluation function with the selected values of the control parameters. The hall call generated is allotted to an adaptive elevator on the basis of the evaluation result.

Further, a control parameter for a certain control item as mentioned above represents the degree of influence of the control item in an evaluation function. If, therefore, a control parameter or parameters are selected at an arbitrary value, the degree of a control item or items, which is to be considered in the evaluation function, can be adjusted.

The prior art of this kind is disclosed in the Japanese laid-open patent application JP-A-58/52162 (1983) or 58/63668 (1983), for example.

According to the prior publications as described above, the adaptive group-control of an elevator system can be realized in response to an operating state of the elevator system, unless a number of control items to be considered is large If, however, the number thereof increases, an increased number of times of the simulation is required for obtaining control parameters accordingly and therefore time to obtain appropriate parameters is elongated. As a result, there-arises a problem that it takes a long time to respond to the change in the operating state.

Further, the above said prior art usually has been provided with only a particular type of the evaluation function. This is also one of the reasons why the prior art could not quickly respond to the large change in the operating state. To improve this, another prior art as disclosed in Japanese laid-open patent application JP-A-59/223672 (1984) has been proposed.

According thereto, there are provided plural evaluation methods and a final evaluation value for every elevator is obtained synthetically by weighting the respective evaluation methods in accordance with the operating state of the elevator system. An adaptive elevator is determined on the basis of the final evaluation values thus obtained for every elevator. By providing the plural evaluation methods in advance, this prior art can be more quickly respond to the change in the operating state.

Also in this prior art, a parameter for a control item and a coefficient of weighting the plural evaluation methods are obtained by the simulation. In this prior art, a control item to be considered is a waiting time only and a procedure of the simulation for obtaining the parameter and the weighting coefficient is fixed, so that the simulation in this prior art may be made simpler than that in the prior art previously described.

If, however, the number of control items to be considered increases, the effect of shortening the time of the simulation is not clear even in this prior art, because it only discloses the case in which only one control item is considered and the procedure of the simulation is fixed. It can be sufficiently presumed that if the number of control items increases, it will become considerably troublesome and time-consuming to carry out the simulation with respect to every parameter and weighting coefficient and to determine the appropriate values thereof. Accordingly, the appropriate allotment of hall calls to adaptive elevators can not be expected to timely respond to the change in the operating state of an elevator system.

SUMMARY OF THE INVENTION

An object of the present invention is to solve the above mentioned problems of the prior art and to provide a group-management control method and apparatus for an elevator system capable of accomplishing the appropriate allotment of hall calls to adaptive elevators by using an optimum evaluation function even in an increased number of control items.

A feature of the present invention resides in that, in a group-management control method and apparatus for an elevator system with plural elevators capable of serving plural floors, in which hall calls are allotted to adaptive elevators in accordance with a predetermined hall call allotment algorithm for the purpose of achieving desired control target or targets, plural kinds of the hall call allotment algorithm with different schemes are provided, and the predetermined hall call allotment algorithm is selected therefrom by a reasoning operation, which is executed in accordance with a reasoning rule selected from among reasoning rules empirically provided in advance on the basis of the desired control target or targets and an operating state of the elevators.

According to one of the further detailed features of the present invention, each of the plural kinds of the allotment algorithm has a particular evaluation function including evaluation indexes of a control target or targets and variable control parameters associated with the respective indexes.

According to one of embodiments of the present invention, a service operation of the elevators is simulated by using a selected allotment algorithm and control parameters included in the evaluation function of the selected algorithm are determined on the basis of the result of the simulation.

In such an embodiment, a procedure of the simulation is determined by a reasoning operation executed in accordance with reasoning rule selected from among the reasoning rules on the basis of the desired control target or targets and the operating state of the elevators.

Further, a range of each control parameter is determined by a reasoning operation executed in accordance with one selected from among the reasoning rules on the basis of the desired control target or targets and the operating state of the elevators.

Moreover, both the procedure of the simulation and the range of each parameter can be determined by the reasoning operation. For the aforesaid control target, as will be apparent from the description of the embodiments, various kinds of control targets can be used.

BRIEF DESCRIPTION OF THE DRAWINGS

FIGS. 3a to 3c and FIGS. 4a to 4f show details of various tables involved in the software configuration as shown in FIGS. 2a and 2b;

FIG. 5 is a flow chart illustrating a predictive arrival time calculating program, which is one of the main programs constituting an elevator operation control program included in the operation control system software of FIG. 2a;

FIG. 9 shows an example of a table of destination-traffic demand, which is one of the data collected by the data collection program of FIG. 8;

FIG. 15 shows an example of contents of a data base table for the reasoning operation, which is a part of a reasoning table (FIG. 2b);

FIG. 16 shows an example of contents of a rule base table for the reasoning operation, which is also a part of the reasoning table;

FIG. 17 is an explanatory drawing showing characteristic curves of a cage-load factor versus a threshold thereof, which is used for explaining the operating mechanism of one of the rules for the reasoning operation;

DESCRIPTION OF THE PREFERRED EMBODIMENTS

In the following, explanation will be made of embodiments of the present invention, referring to the accompanying drawings.

I Hardware Construction

Figure 1:
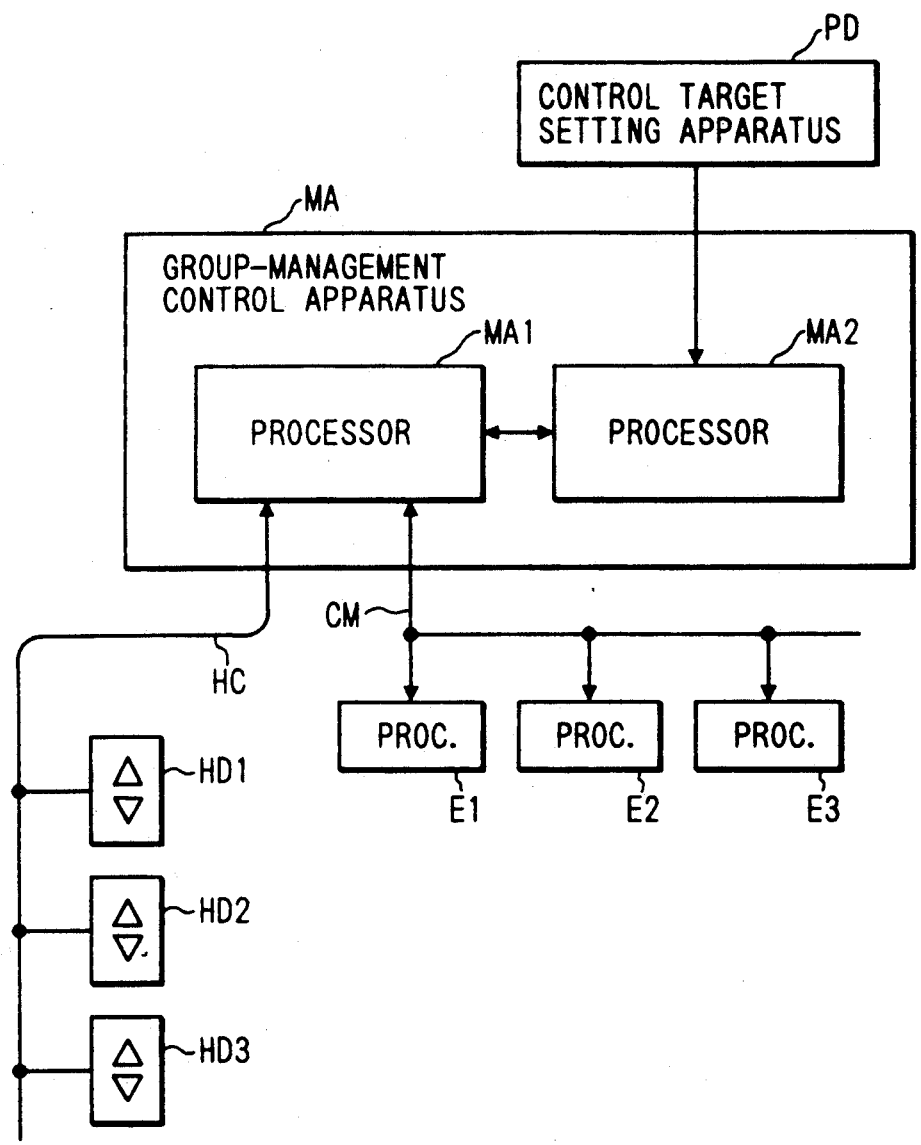
FIG. 1 is a block diagram schematically showing an overall hardware construction of a group-management control apparatus for an elevator system according to an embodiment of the present invention.

Referring at first to FIG. 1, there is shown an overall hardware construction of a group-management control apparatus for an elevator system according to an embodiment of the present invention.

As shown in the figure, a group-management control apparatus MA comprises processors MA1 and MA2 coupled with each other. The processor MA1 executes various elevator operation control programs as described in detail later to function as an elevator operation control unit. The processor MA2 executes various programs (which will be also described in detail later) concerning the group-management of operation of plural elevators to function as a group-management method determining unit.

The group-management method determining unit MA2 determines a method of allotting then existing hall calls to adaptive elevators. The elevator operation control unit MA1 carries out the group-control of the service operation of elevators in accordance with the hall call allotment method determined by the unit MA2.

A control target setting apparatus PD is coupled to the processor MA2, i.e., the group-management method determining unit. The apparatus PD has an appropriate input/output device and a table for setting various control targets and supplies desired control targets to the processor MA2 by an operator's manipulation of the input/output device. An apparatus of this kind is disclosed in detail in the U.S. patent application Ser. No. 301,973 filed Jan. 26, 1989, and assigned to the same assignee Therefore, further description of this apparatus will be omitted here.

The processor MA1, i.e., the elevator operation control unit, is coupled to hall call devices provided in an elevator hall of every floor of a building through a line HC, but only three devices HD1, HD2 and HD3 are shown in the figure. When a person waiting at a certain floor manipulates a hall call device of the floor, a hall call is generated to receive the service of an elevator The processor MA1 is further coupled to processors E1, E2, E3 through a line CM. These processors E1, E2, E3 carry out the control of the service operation of individual elevators on the basis of operation instructions supplied from the processor MA1. Since many kinds of programs have been proposed heretofore as an individual elevator control program to be executed by the processors E1, E2, E3, the description thereof will be omitted here.

As described above, this embodiment has the control target setting apparatus PD and therefore a control target or targets can be altered even during the service operation of an elevator system. However, it is to be noted that the application of the present invention is not limited to this type. If a control target or targets are fixed in advance and not necessary to be altered during the service operation, the control target setting apparatus PD can be omitted In this case, the control target or targets provided are set in advance in a control target table which is included in the group-management method determining unit MA2 and will be referred to later.

II Overall Configuration of Software

Figure 2A:
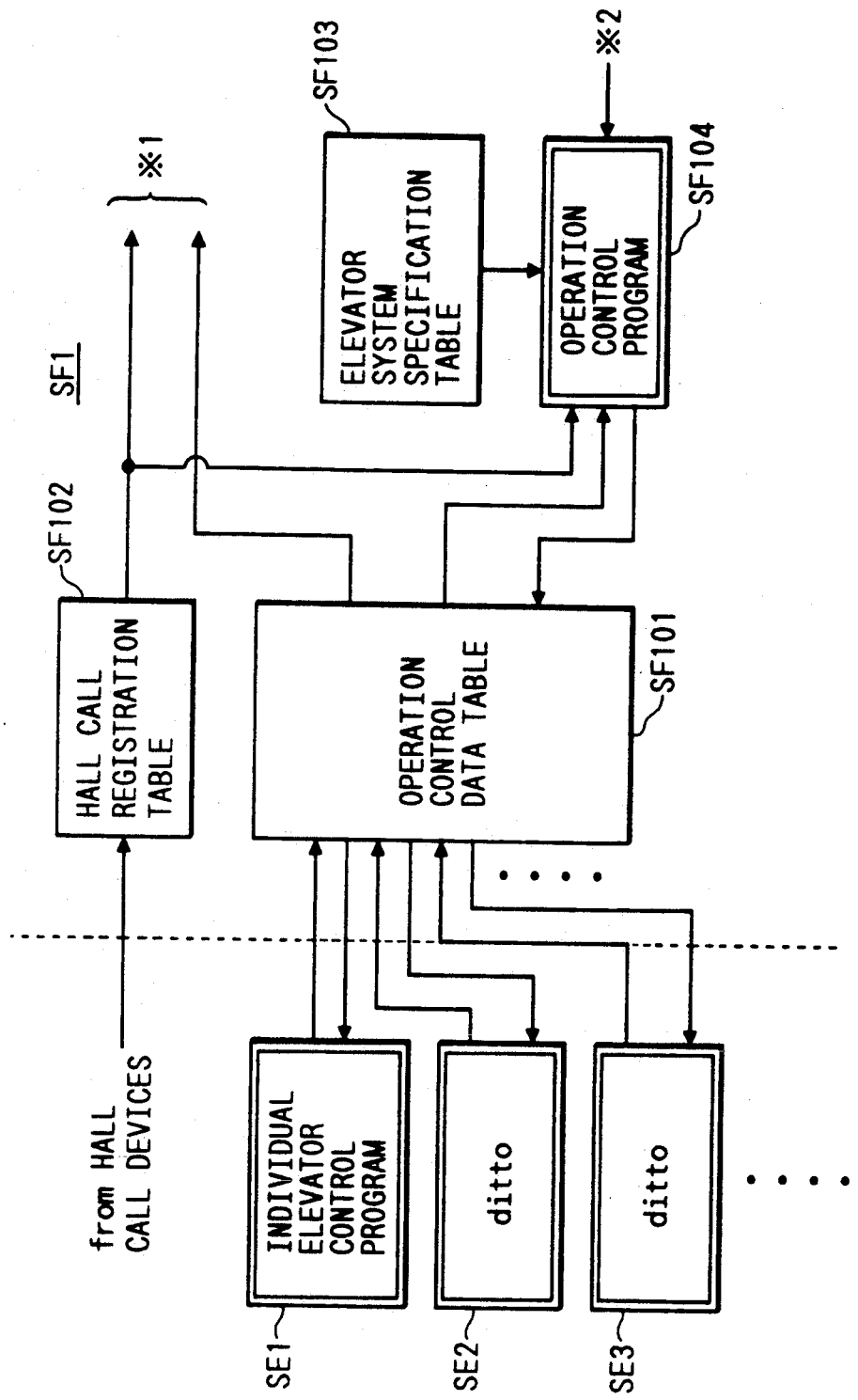
FIGS. 2a and 2b are block diagrams schematically showing an overall software configuration executed by the group-management control apparatus of FIG. 1; in which the software configuration being composed of two parts, i.e., a software for an operation control system (FIG. 2a) and a software for a simulation (FIG. 2b)
Figure 2B:
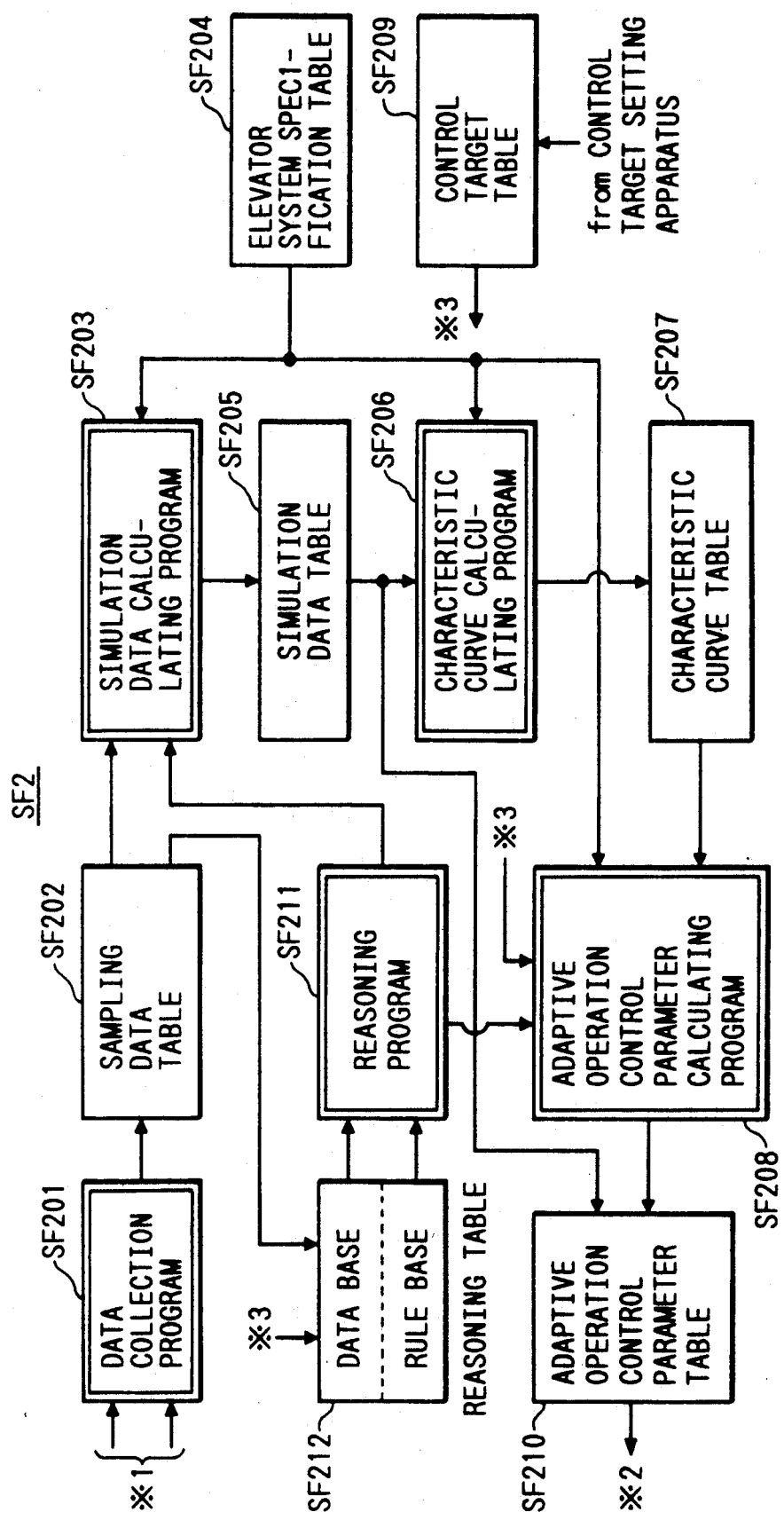

Referring next to FIGS. 2a and 2b, the overall configuration of the software to be executed by the group-management control apparatus MA will be explained hereinafter. In these figures, a block surrounded by double lines means a program and a block surrounded by a single line a table storing necessary data.

2.1 Elevator Operation Control Software SF1

FIG. 2a shows a configuration of a software SF1 of an elevator operation control system which is executed by the processor MA1, and also includes individual elevator control programs SE1, SE2, SE3 executed by the processors E1, E2, E3.

As a main program, this software SF1 comprises an operation control program SF104 which conducts a processing concerning the group-control of the service operation of plural elevators, such as a hall call allotment, a service of plural elevators to specific floors, a dispersive stand-by of elevators, etc..

When executed, the individual elevator control programs SE1, SE2, SE3 collect various information concerning the operating state of respective elevators, as well as control the service operation of the corresponding elevators under the control and management of the processor MA1. Such information is temporarily stored in a predetermined table defined within an operation control data table SF101. The information to be collected include positions of the respective elevators traveling directions thereof cage calls generated within cages thereof and so on.

Hall calls generated by the hall call devices HD1, HD2, HD3 are registered in a hall call registration table SF102. In an elevator system specification table SF103, there are stored specific data of an elevator system, such as dimensional data, a number of elevators to be group-controlled, a number of floors of a buildings installed with the elevator system and so on.

Data stored in the tables SF101, SF102 and SF103 as well as various control parameters obtained by the simulation software SF2 described below are supplied to the operation control program SF104.

2.2 Simulation Software SF2

As shown in FIG. 2b, the software SF2 for the simulation comprises several programs, as follows. At first, the software SF2 has a data collection program SF201 for collecting basic data for simulation by periodically sampling contents of the operation control data table SF101 and the hall call registration table SF102 at constant time intervals. One of the most important data collected by this program SF201 is a traffic demand obtained for every traveling path from a hall call originating floor to a destination floor (called a destination-traffic demand, hereinafter).

The data sampled by the program SF201 is stored in a sampling data table SF202. The table SF202 stores not only data currently obtained, but also data obtained in previous time periods.

A simulation data calculating program SF203 is a program for reading therein the basic data stored in the table SF202 and processing them by further using data supplied from an elevator system specification table SF204 to provide various data for the simulation. Other information is given to this program SF203 from a reasoning program SF211. This information will be explained later. The simulation data obtained by this program SF203 is stored in a simulation data table SF205.

Further, the table SF204 has the same contents as the elevator system specification table SF103 in the operation control system software SF1 (FIG. 2a). Therefore, either one of those two tables SF103 and SF204 can be used in common to both the software. In this embodiment, however, there are provided the respective tables SF103 and SF204 for the convenience of control.

A characteristic curve calculating program SF206 is a program for reading therein the data stored in the simulation data table SF205 and the elevator system specification table SF204 and carrying out a predetermined simulation to obtain such various characteristic curves as described later. The aforesaid simulation is carried out for every control parameter to be considered.

As the characteristic curves obtained by this program SF206, there are for example a waiting time characteristic curve, a riding time characteristic curve, a cage-load factor characteristic curve, a power consumption characteristic curve and so on. Data concerning the thus obtained various characteristic curves are stored in a characteristic curve table SF207.

An adaptive operation control parameter calculating program SF208 carries out a predetermined calculation by using the data stored in the elevator system specification table SF204, the characteristic curve table SF207 and a control target table SF209 and outputs various kinds of adaptive operation control parameters. With the thus obtained control parameters, an elevator system can provide the service operation most suited for a kind of a building installed with the elevator system and the state of use thereof at that time.

The control parameters obtained by the program SF208 are stored in an adaptive operation control parameter table SF210. Further, a part of the contents of the simulation data table SF205 is also stored in this table SF210, whereby a so-called learning function can be accomplished, because the result of the actual operation of elevators is evaluated by the simulation software SF2. The contents of the table SF210 are supplied to the operation control program SF104 of the operation control system program SF1 (FIG. 2a).

A reasoning program SF211 is a program for performing reasoning for a range of control parameters, in which the control parameters are to be changed during the simulation, and a procedure of the simulation in accordance with rules stored in a reasoning table SF212 as a rule base on the basis of data stored in the table SF212 as a data base. The rule base for the reasoning will be explained in detail later. The data base for the reasoning includes data supplied from the sampling data table SF202 and the control target table SF209. The result of the reasoning is supplied to the simulation data calculating program SF203 and the adaptive operation control parameter calculating program SF208.

2.3 Configuration of Tables

Referring next to FIGS. 3a to 3c and FIGS. 4a to 4f, explanation will be made of the configuration of the various tables as mentioned above.

FIGS. 3a to 3c show details of the tables SF101, SF102, SF103 of the operation control system software SF1 (FIG. 2a). As shown in FIG. 3a, the operation control data table SF101 comprises at least the following six tables, i.e., a table for the state of elevators, a cage call registration table, an allotted hall call registration table, a predictive arrival time table, a table for time elapsed from a registration of a hall call and a work table. Except for the work table, each table has storage areas corresponding to every elevator and every floor, and the work table has storage areas corresponding to every elevator only.

In the table for the state of elevators, data, such as a current position of each elevator, a traveling direction thereof, a number of passengers within a cage thereof and so on, are stored. The cage call registration table stores calls generated within an elevator cage together with their destination floors. In the alloted hall call registration table hall calls to which available elevators are already allotted are registered.

The predictive arrival time table stores a predictive time form a given time point after generation of a hall call at a certain floor to a time point of arrival of an available elevator at the floor. The elapsed time table stores a time elapsed from a time point of registration of a hall call to the aforesaid given time point. Therefore, a sum of contents stored in corresponding areas of these two time tables indicates a waiting time for which a person who generates a hall call should wait for the arrival of an available elevator. The work table is used during the execution of the various programs.

The hall call registration table SF102 shown in FIG. 3b has storage areas corresponding to every floor and every required traveling direction. As shown in FIG. 3c, the elevator system specification table SF103 includes at least the following seven tables, i.e., tables for a number of elevators, a number of floors of a building, floors to be served, a base floor (a lobby floor), dispersive stand-by floors, nominal capacities of elevators, a traveling speed of elevators and so on. These tables will be further referred to in the explanation of the operation system software SF1.

FIGS. 4a to 4f show details of the tables SF202, SF205, SF207, SF212, SF209, SF210 of the simulation software SF2 (FIG. 2b), respectively. Details of the elevator system specification table SF204 is omitted, because it has the same details s the table SF103 as shown in FIG. 3c. Contents stored in these tables and their function will be made clear in the explanation of the simulation software SF2.

III Details of Software SF1 & SF2

In the following, programs included in the operation control system software SF1 and the simulation software SF2 will be explained in detail, referring to respective flow charts. Further, the software SF1 and SF2 are divided into plural tasks, respectively, so that they can be efficiently executed under the control and management of a system program, i.e., a real-time operating system. As a result, a start or pause of the execution of programs for accomplishing the tasks can be effected by a system timer or another program.

3.1 Operation Control System Software SF1

Referring at first to FIGS. 5, 6 and 7a to 7c, explanation will be made of two programs, i.e., an elevator arrival time predicting program and a hall call allotment program which are included in the operation control system program SF104 and have special importance therein.

3.1.1 Elevator Arrival Time Predicting Program

Figure 5:
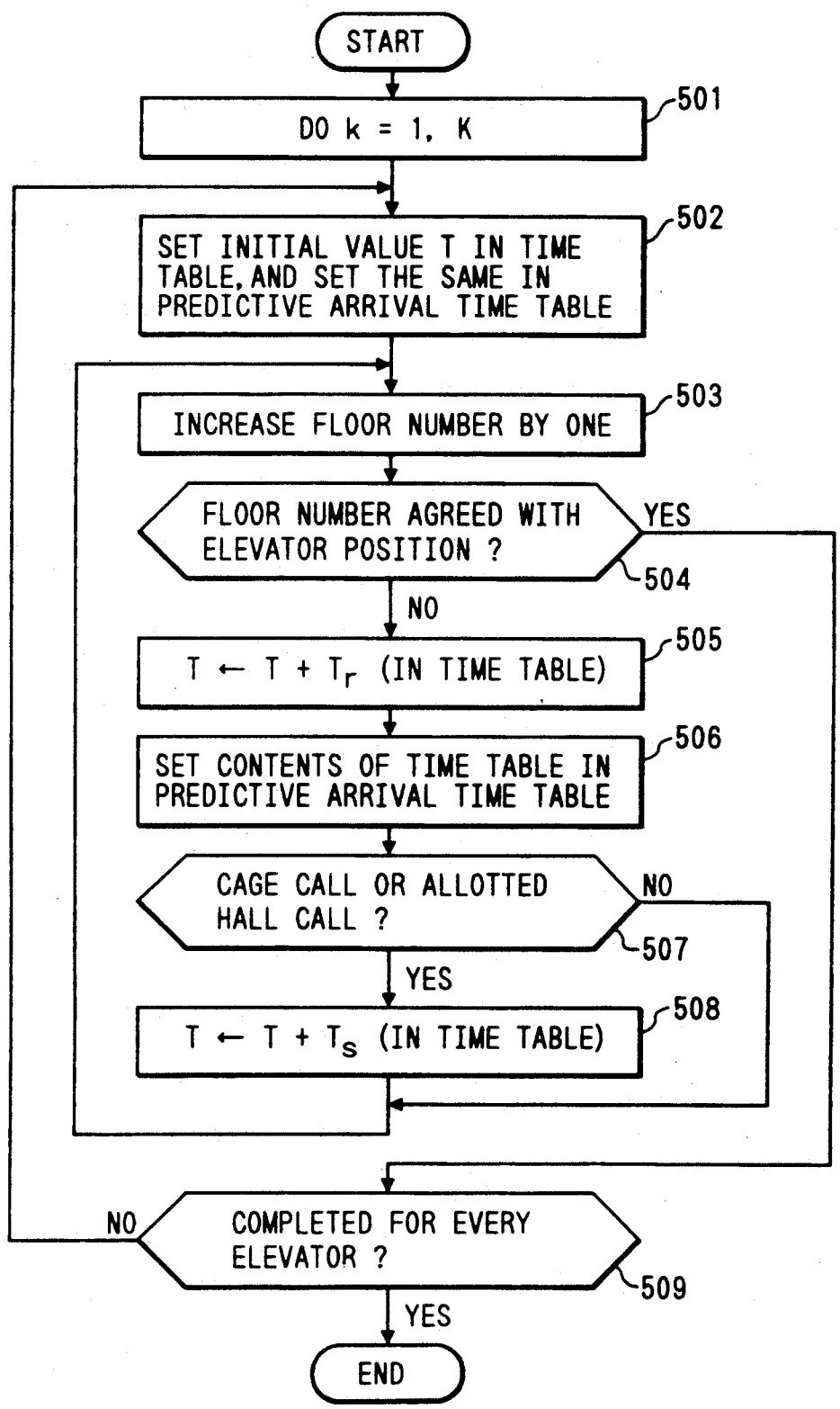

FIG. 5 shows a flow of a program for predicting a time of arrival of an elevator at a floor in which a hall call exists. This predictive arrival time provides basic data for calculating an evaluation value concerning a waiting time. This program is periodically started by a system timer every one second, for example, to calculate a predictive arrival time of an elevator from a current position to a certain floor, for every floor and every elevator.

In the figure, steps 501 and 509 indicate that a loop processing operation shown is executed for all the elevators, a total number of which is K, as shown in step 501.

At first, a number k of an elevator, for which a predictive arrival time is to be calculated, is designated at step 501. Next, at step 502, an initial value T is set in a predetermined area (called a time table, hereinafter) of the work table of the table SF101, and simultaneously the initial value T is transferred to a predictive arrival time table (cf. FIG. 3a) of the same.

As the initial value mentioned above, the following time can be considered; i.e., a time, which is necessitated for an elevator at a certain floor to start the traveling from a current status thereof, or a time necessary for restarting an elevator, which is in the condition of pause.

Then, a number of a floor is increased by one at step 503, and it is discriminated at step 504 whether or not the increased floor number agrees with a current position (floor) of the elevator. The meaning of step 504 will be explained later. When the floor number agrees with the current position, the processing operation goes to step 509, at which it is discriminated whether or not the processing operation of this flow is completed for every elevator.

If completed for every elevator, the processing operation of this flow ends. Otherwise, the processing operation returns to step 502 and is repeated with respect to another elevator.

At step 504, if it is judged that the floor number does not agree with the current position of the elevator yet, the processing operation goes to step 505, at which a time $T_r$ necessary for traveling for one floor is added to contents (T) of the time table of the work table, whereby the new value of T is obtained. The new value of T is stored in the time table again.

The renewed contents of the time table is set in the predictive arrival time table of the table SF101 at step 506. After that, it is discriminated at step 507 whether or not a cage call or an allotted hall call exists. If any call does not exist, the processing operation returns to step 503. Otherwise, the processing operation goes to step 508, at which a time $T_s$ necessitated for a traveling elevator to stop at a floor and to restart therefrom is added to contents (T) of the time table, whereby the current value of T is renewed. The new value of T is stored in the time table again.

Thereafter, the processing operation returns to step 503, at which the floor number is increased by one, and the processing operation as described above is repeated until it is judged at step 504 that the floor number agreed with the current position of the elevator. Therefore, a loop operation of steps 503 to 508 is repeated with the floor number increased.

The meaning of step 504 is as follows. It is assumed here that, at step 503, the floor number is increased in the direction of the upward traveling of an elevator, for example. In this case, the floor number will reach a number of a top floor finally. After that, the floor number is advanced in the direction of the downward traveling, until it reaches a number of a bottom floor. Then, the floor number is increased in the upward direction again, and the increasing of the floor number must stop when it becomes equal to a number of a starting floor in the loop operation.

Therefore, the program of FIG. 5 can provide a total predictive time, in which an elevator travels from a certain floor to one end floor, then from the one end floor to the other end floor and from the other end floor to the certain floor, while serving floors corresponding to then existing cage calls and allotted hall calls. In other words, viewed from a point of view of every hall call, a time, in which the elevator arrives at a floor corresponding to every hall call, can be given.

Such a time means a predictive arrival time measured from a given time point, at which the processing operation begins. If, therefore, a time elapsed from a generation or registration of a hall call to the given time point is measured, a waiting time in a floor, at which the hall call is generated, can be predicted by adding the elapsed time to the predictive arrival time.

By repeating the processing operation as mentioned above by steps 501 and 509, a predictive arrival time can be obtained for every elevator. Further, in the processing operation mentioned above, the times $T_r$ and $T_s$ used in steps 505 and 508 are provided as ones of the adaptive operation control parameters by the simulation software SF2 as described later.

1.2 Hall Call Allotment Program

Figure 6:
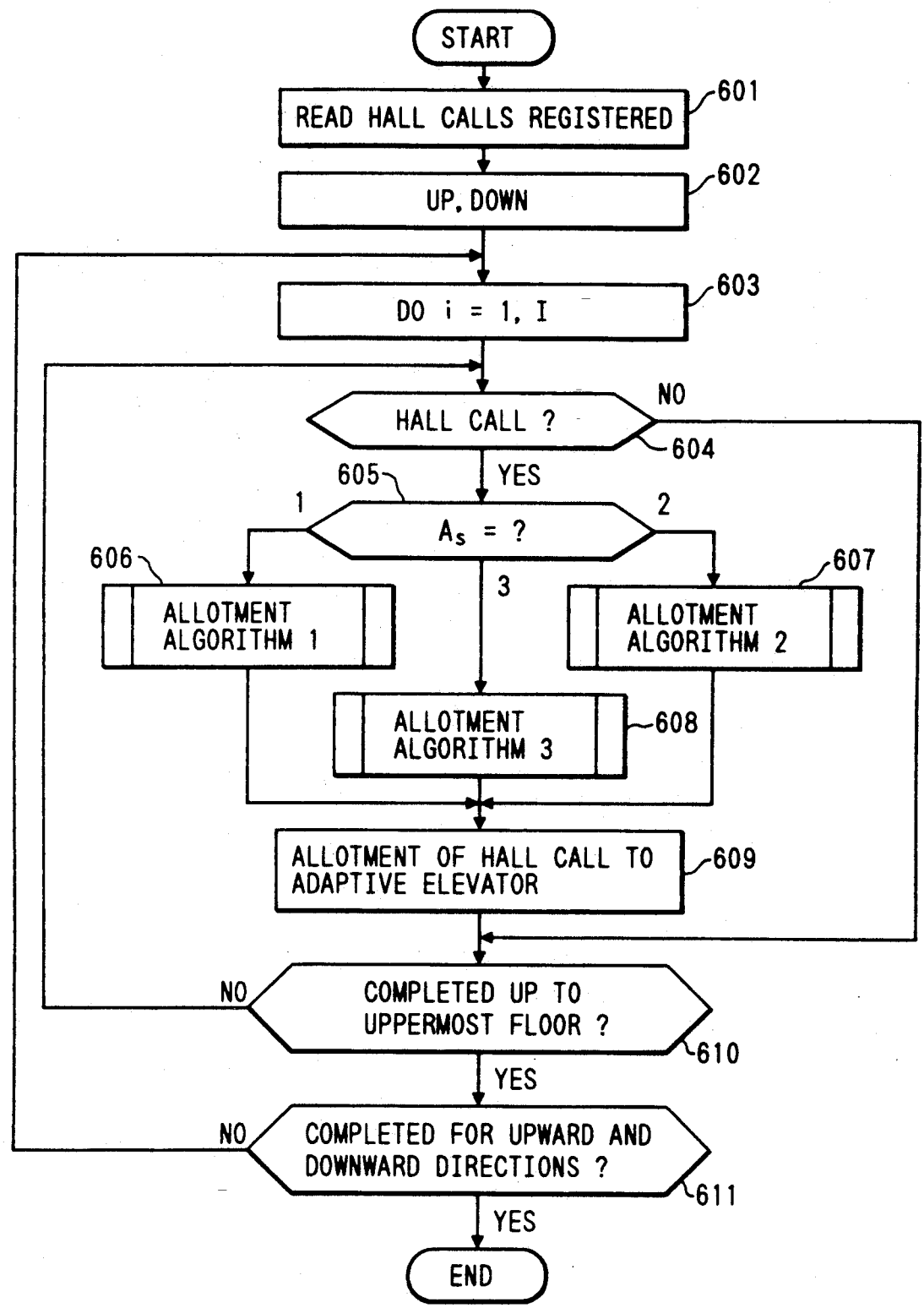
FIG. 6 is a flow chart illustrating a hall call allotment program, which is also one of the main programs constituting the elevator operation control program.

FIG. 6 is a flow chart of the hall call allotment program, which is initiated in response to generation of a hall call, In this program, there are provided plural kinds of an algorithm for allotting a hall call generated to an adaptive elevator, one of which can be selected in accordance with the change in an operating state of an elevator system. Further, it is more preferable to be so designed that one or more new kinds of algorithm can be further added, some of the originally provided algorithms can be removed or the originally provided algorithm can be changed.

In the program shown in FIG. 6, there are provided three kinds of the hall call allotment algorithm; i.e., algorithm 1, algorithm 2 and algorithm 3, which will be explained in detail later, referring to FIGS. 7a to 7c, respectively. One of these three kinds of the algorithm can be selectively used in response to an algorithm selection parameter $A_S$, which is provided as one of the adaptive operation control parameters by the simulation software SF2 as described later.

Referring now to FIG. 6, there will be explained the processing operation of this program in the following.

When this program is started in response to generation of a hall call, the registration status of hall calls is at first read at step 601 and thereafter either one of the traveling direction of an elevator, i.e., an upward travel or a downward travel, is set at step 602. Further, this step 602 and step 611 described later constitute a loop operation, which means that a processing operation as described below is repeatedly executed with respect to both the upward and downward travels of an elevator.

Then, at step 603, a floor number i is set, in which I denotes a total number of floors of a building. Also this step 603 constitutes a loop operation together with step 610 described later, which means that a processing operation as described below is repeatedly executed for every floor.

After the floor number i is set at step 603, it is discriminated at step 604 whether or not a hall call is generated at the i-th floor. If there is no hall call at the floor, the processing operation jumps to step 610, at which it is discriminated whether or not the i-th floor is one of end floors, i.e., an uppermost floor or a lowermost floor. If the i-th floor is judged to be not the end floor, the processing operation returns to step 604, at which after the floor number i is advanced by one, it is discriminated again whether or not a hall call exists at the (i+1)-th floor.

If a hall call exists at the i-th floor, a value of the algorithm selection parameter $A_S$ is checked at step 605, and one of the allotment algorithms 1, 2 and 3 is selected in accordance with the value of $A_S$. In this embodiment, when $A_S$ is 1, 2 and 3, the allotment algorithm 1, 2 and 3 is selected, respectively (steps 606, 607 and 608). After the allotment algorithm is selected, the hall call at the i-th floor is allotted to an adaptive elevator in accordance with the selected allotment algorithm at step 609.

As already described, by the function of steps 603 and 610, the processing operation as described above is repeatedly executed with respect to all the floors 1 to I. If this processing operation is completed up to the one end floor, it is discriminated at step 611 whether or not the processing operation is completed for both the traveling directions. If completed, the processing operation ends. Otherwise, the processing operation returns to step 603 and is repeated with respect to the other traveling direction.

All elevators of the elevator system effectively operate in accordance with the hall call allotment obtained by the execution of this program, whereby hall calls can be served appropriately by adaptive elevators.

Next, the three kinds of the allotment algorithm 1, 2 and 3 provided as subroutine programs executed at steps 606, 607, 608 will be explained, referring to FIGS. 7a to 7c.

Before that, control items or targets referred to in the following explanation will be described briefly. At first, "waiting time" means a time from the registration of a hall call by a person waiting at a certain floor to the arrival of an available elevator at the floor. Such a waiting time that exceeds one minute, for example, is especially called a long-waiting time. "Riding time" means a time from the registration of a cage call by a passenger within an elevator cage to the arrival of the elevator at a floor corresponding to the cage call. "Cage-load factor" means a ratio of a number of passengers within an elevator cage to the nominal capacity thereof. The degree of the crowdedness within an elevator cage can be indicated by this factor.

Figure 7A:
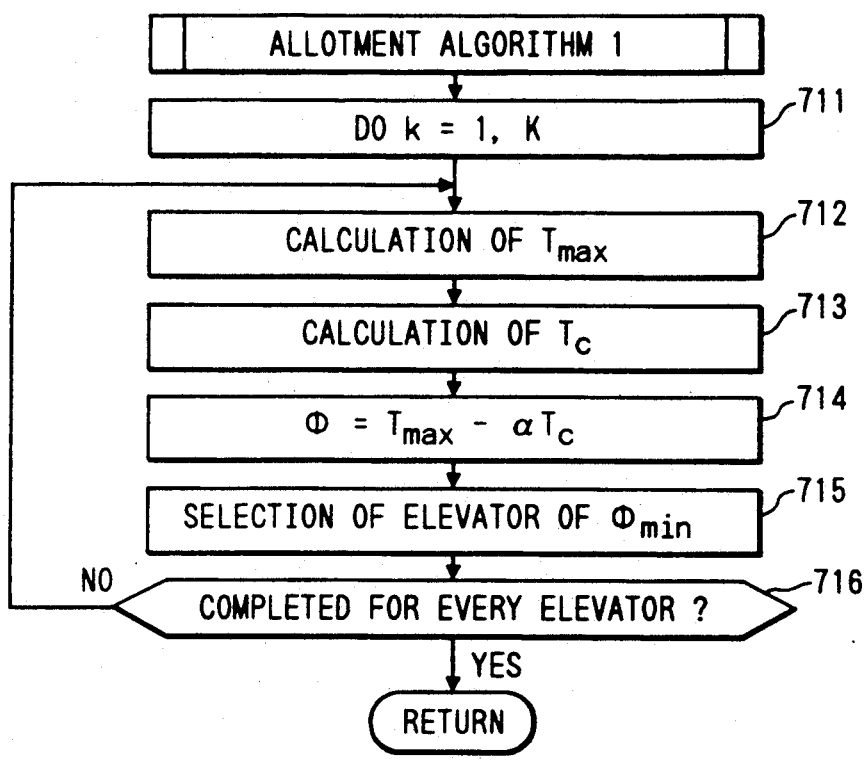
FIGS. 7a to 7c are flow charts illustrating three kinds of subroutine programs, which are based on different schemes for a hall call allotment and selectively used in the hall call allotment program of FIG. 6.

(1) Allotment Algorithm 1 (FIG. 7a)

In this embodiment, a long-waiting time minimizing scheme is provided for this algorithm 1. According to this scheme, then existing hall calls are allotted to elevators in such a manner that a longest one of all predictive waiting times obtained at that time is made as short as possible. To this end, a predetermined evaluation function is used, by which an evaluation value of every elevator is obtained with respect to hall calls. An elevator having a maximum or minimum evaluation value (a minimum one in this example) with respect to a hall call is selected as an adaptive elevator to serve the hall call.

The subroutine program of FIG. 7a is executed with respect to a hall call which has been judged to exist in the i-th floor designated (cf. steps 603 and 604 of FIG. 6). At first, an elevator k is designated at step 711. In the same manner as already described with reference to the previous flow charts, steps 711 and 716 represent that a processing operation as described below is repeatedly executed for every elevator. Therefore, in step 711, K denotes a total number of elevators.

Then, at step 712, a maximum predictive waiting time $T_{max}$ is calculated. This $T_{max}$ is obtained by selecting a maximum one from among all of predictive waiting times of several floors, including the i-th floor, which are forwards in the traveling direction. This maximum predictive waiting time $T_{max}$ is used as an evaluation index of a waiting time.

Further, at step 713, an evaluation index $T_c$ of a stop call is calculated with respect to several floors, which are forwards and backwards of the i-th floor. The stop call means a cage call generated in a cage of the elevator k designated at step 711 and a hall call already allotted to the elevator k. Therefore, the elevator k always stops at the floor corresponding to the stop call.

If, however, a stop call is not a cage call generated within the cage of the elevator k, but an already allotted hall call, there may be a case where it is more preferable in accordance with the operating state of the elevator system that another elevator serves the stop call. In such a case, the elevator k does not always stop at a floor corresponding to its stop call, and therefore a certain probability (called a stop probability) must be considered with respect to every stop call. Such a probability can be experimentally determined in advance.

The stop call evaluation index $T_c$ as mentioned above is obtained on the basis of the aforesaid stop probability and its weight coefficient.

At step 714, an evaluation value $\phi$ of the elevator k with respect to the hall call at the i-th floor is calculated in accordance with a predetermined evaluation function. In this case, the evaluation function is as follows:

$$\phi = T_{max} - a \cdot T_c$$

wherein $a$ denotes a control parameter, which is given as one of the adaptive control parameters by the adaptive operation control parameter calculating program SF208 described in detail later.

Such an evaluation value $\phi$ is calculated for every elevator, and at step 715, an elevator having a minimum value $\phi_{min}$ is selected as an adaptive elevator to serve the hall call. Thereafter, it is discriminated at step 716 whether or not the processing operation is completed for every elevator, and if completed, the processing operation returns to the flow chart of FIG. 6.

Figure 7B:
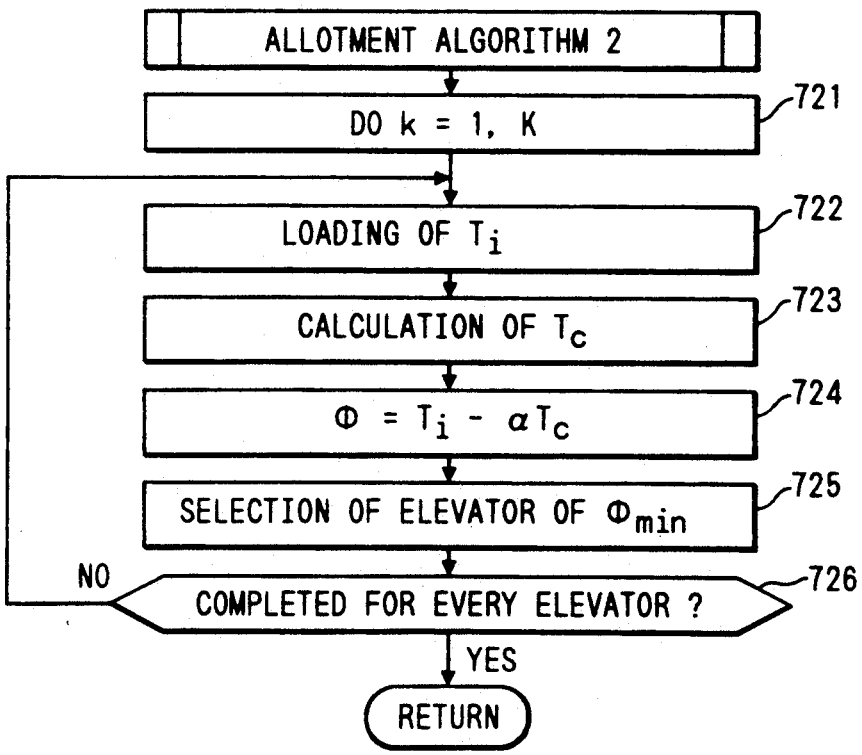

(2) Allotment Algorithm 2 (FIG. 7b);

The algorithm 2 is based on a predictive arrival time minimizing scheme. According to this scheme, an elevator, which has a smallest evaluation value of the predictive arrival time with respect to a hall call, is selected as an adaptive elevator to serve the hall call. This subroutine program is also executed with respect to a hall call which has been judged to exist in the i-th floor designated (cf. steps 603 and 604 of FIG. 6).

To avoid unnecessary prolixity, only the difference of this program from that of FIG. 7a will be explained in the following. In this program, a predictive arrival time of a hall call in each floor is used as an evaluation index, instead of $T_{max}$ in FIG. 7a. At step 722, therefore, the predictive arrival time $T_i$ in the i-th floor is loaded in a predetermined area of the work table. Accordingly, also the evaluation function in step 724 becomes as follows.

$$\phi = T_i - a \cdot T_c$$

Remaining steps of this program are quite the same as those of the program of FIG. 7a. Therefore, further description is omitted.

Figure 7C:
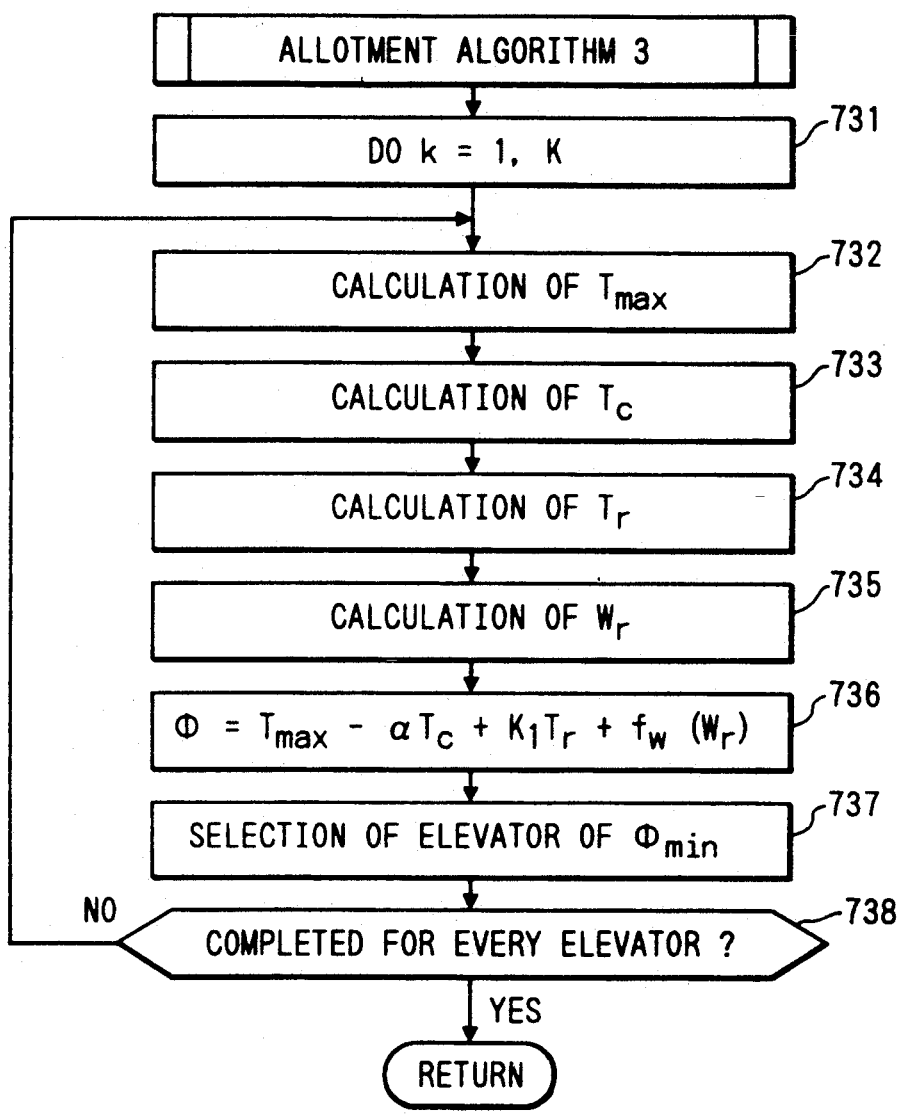

(3) Allotment Algorithm 3 (FIG. 7c);

This algorithm is called a multi-target control scheme, because the hall call allotment is carried out, taking account of plural control targets. In this example shown, an evaluation index $T_r$ of the riding time and an evaluation index $f_w(W_r)$ depending on the cage-load factor $W_r$ are taken into consideration, in addition to the evaluation indexes $T_{max}$ and $T_c$ in the long-waiting minimizing scheme of FIG. 7a.

Accordingly, there are added to the flow chart of FIG. 7a steps 734 and 735 for obtaining the evaluation indexes $T_r$ and $f_w(W_r)$, and the evaluation function is altered to include such new evaluation indexes as shown in step 736.

The index $T_r$ can be predictively obtained from a continuing time of a cage call and a destination floor. In the evaluation function of step 736, $k_1$ denotes a constant weighting of the control target of the riding time, which is given as one of the adaptive control parameters by the adaptive operation control parameter calculating program SF208.

The index $f_w(W_r)$ is also given as one of the adaptive control parameters by the adaptive operation control parameter calculating program SF208. In the later drawings and explanation, this index $f_w(W_r)$ will be referred to as a threshold of the cage-load factor.

Except the processing operation concerning the two indexes mentioned above, the processing operation of this program is, as a whole, the same as that of the program of FIG. 7a. Therefore, further description is omitted for purpose of brevity.

Further, there can be considered many kinds of variations of the multi-target control scheme. For example, the evaluation indexes of the riding time and the cage-load factor as mentioned above can be incorporated into the predictive arrival time minimizing scheme of FIG. 7b. Other types of the allotment algorithm can be of course adopted instead of or in addition to the schemes of the allotment algorithm as mentioned above.

In the operation control program SF104, there are included for example a plural elevator service program, which makes plural elevators preferentially serve a crowded floor, a dispersive stand-by program, by which some of elevators are made to be in the stand-by condition at predetermined floors during light traffic, and so on. However, detailed description about such programs are omitted here, because those programs have no special relation to the essence of the present invention.

3.2 Simulation Software SF2

In the following, explanation will be made of various programs of the simulation software SF2.

3.2.1 Data Collection Program SF201

Figure 8:
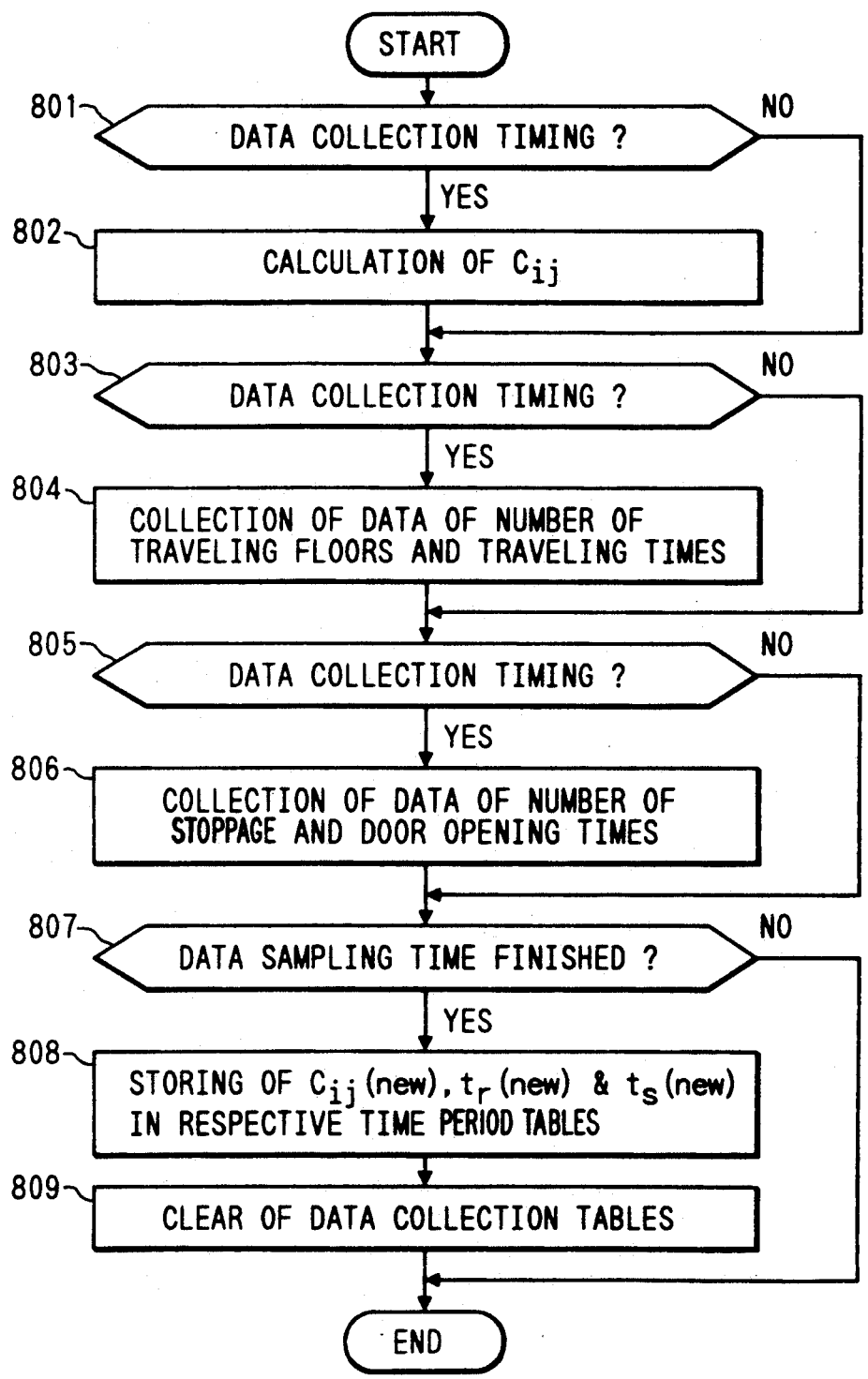
FIG. 8 is a flow chart illustrating a data collection program, which is one of programs included in the simulation software of FIG. 2b.

FIG. 8 shows a flow chart of this program, which is periodically initiated by the system timer at constant time intervals, one second, for example, and samples data concerning the service operation of the elevator system for a predetermined time period from the operation control data table SF101 and the hall call registration table SF102 (FIG. 2a). The collected data is stored in a sampling data table SF202.

The data to be collected by this program SF201 includes at least a traffic demand $C_{ij}$ for every traveling path from a hall call originating floor i to a destination floor j (called a destination-traffic demand, hereinafter), a time $t_r$ necessary for an elevator to travel between two adjacent floors (called a one-floor traveling time, hereinafter) and a time $t_s$ necessary for an elevator to stop at a floor in response to a stop call and restart therefrom (called a one-stop time, hereinafter).

The data collection program SF201 collects also data concerning a riding time, a cage-load factor and so on in accordance with the necessity of control. In FIG. 8, however, there is shown an example of the program which collects the three kinds of data as mentioned above.

After start, it is discriminated at step 801 whether or not it is now a predetermined timing of collection of data concerning the destination-traffic demand $C_{ij}$. If the answer of this step 801 is negative, the processing operation jumps to step 803. Otherwise, the destination-traffic demand $C_{ij}$ is calculated by distributing a number of passengers in an i-th floor for every destination floor j. The number of passengers in the i-th floor means a number of passengers within a cage of an elevator when the elevator departs from the i-th floor and can be detected by a cage load detector usually provided on an elevator cage.

A typical one of examples of a manner of distributing the number of passengers for every destination floor is as follows. Destination floors can be known from then existing stop calls. Therefore, the destination-traffic demand when an elevator departs from the i-th floor can be roughly estimated by dividing the number of passengers in the i-th floor by a number of the stop calls. Namely, the traffic demand in the i-th floor for every destination floor j is obtained as an average number of passengers. Although this may seem to be very rough, it is good enough for this control.

An example of the thus obtained destination-traffic demand $C_{ij}$ is shown in FIG. 9. In the table shown, numerical numbers i arranged in a vertical direction outside the table indicate numbers of floors originating a hall call, and j arranged in a horizontal direction numbers of destination floors. By way of example, therefore, destination-traffic demands for an upward travel in the 5th floor are 2 persons for the 6th floor, 3 persons for the 7th floor and 2 persons for the 8th floor.

Returning to FIG. 8, after the calculation of the destination-traffic demand $C_{ij}$ is completed, it is discriminated at step 803 whether or not it is now a timing of collection of data concerning an one-floor traveling time $t_r$. If the answer of this step 803 is negative, the processing operation jumps to step 805. Otherwise, the processing operation goes to step 804, at which a total number of traveling floors of an elevator and a total traveling time of the elevator are collected for every elevator, whereby the one-floor traveling time $t_r$ is obtained by dividing the total traveling time by the total number of traveling floors. Then, the processing operation goes to step 805.

At step 805, it is discriminated whether or not it is now a timing of collection of data concerning a stop time $t_s$. If the answer of this step 805 is negative, the processing operation jumps to step 807. Otherwise, the processing operation goes to step 806, at which a total number of times of stoppage of an elevator and a total door opening time of the elevator are collected for every elevator, whereby the stop time $t_s$ is obtained by dividing the total door opening time by the total number of times of stoppage. Thereafter, the processing operation goes to step 807.

At step 807, it is discriminated whether or not a data sampling time is finished. If it is not finished, the processing operation of this program ends and pauses until it is initiated again by the system timer. Otherwise, the processing operation goes to step 808, at which the destination-traffic demand $C_{ij}$, the one-floor traveling time $t_r$ and the stop time $t_s$ are stored. Then, after tables used for the aforesaid data collection are cleared at step 809, the processing operation of this program ends.

Further, at step 808, the various data obtained by the current processing operation are stored as $C_{ij}$(new), $t_r$(new) and $t_s$(new) in appropriate areas of the sampling data table SF202. In contradistinction, the data obtained in the previous time period are stored as $C_{ij}(old)$, $t_r(old)$ and $t_s(old)$ in appropriate areas of the table SF202.

3.2.2 Simulation Data Calculating Program SF203

Figure 10:
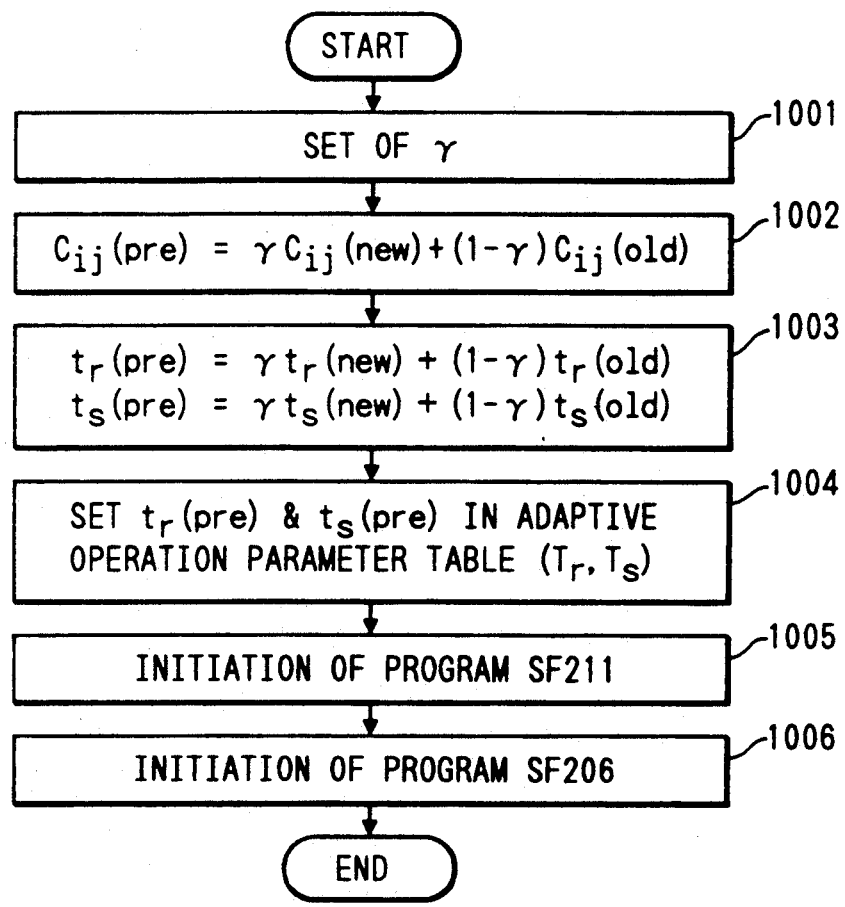
FIG. 10 is a flow chart illustrating a simulation data calculating program, which is also one of the programs included in the simulation software of FIG. 2b.

FIG. 10 shows a flow chart of the simulation data calculating program SF203 for obtaining predictive values of the destination-traffic demand $C_{ij}$, the one-floor traveling time $t_r$ and the stop time $t_s$, which are represented by $C_{ij}(pre)$, $t_r(pre)$ and $t_s(pre)$. This program SF203 is periodically initiated on an off-line basis. The time period is one day, for example.

The $C_{ij}(pre)$, $t_r(pre)$ and $t_s(pre)$ are obtained by combining the $C_{ij}(new)$, $t_r(new)$ and $t_s(new)$ currently obtained with the $C_{ij}(old)$, $t_r(old)$ and $t_s(old)$ already obtained, taking account of a combining coefficient $\gamma$, which is obtained empirically and stored in advance. This coefficient $\gamma$ means to what degree the previous trend is to be considered in the determination of the $C_{ij}(pre)$, $t_r(pre)$ and $t_s(pre)$.

After start of this program SF203, the combining coefficient $\gamma$ is at first set at step 1001. Then, at steps 1002 and 1003, the $C_{ij}(pre)$, $t_r(pre)$ and $t_s(pre)$ are calculated in accordance with formulas indicated in the respective steps.

The thus obtained $t_r(pre)$ and $t_s(pre)$ are set as adaptive operation control parameters $T_r$ and $T_s$ in the adaptive operation control parameter table SF210 at step 1004. Thereafter, the reasoning program SF211 is initiated at step 1005, and then the characteristic curve calculating program SF206 at step 1006. After that, the processing operation of this program SF203 ends.

3.2.3 Reasoning Program SF211

Figure 11:
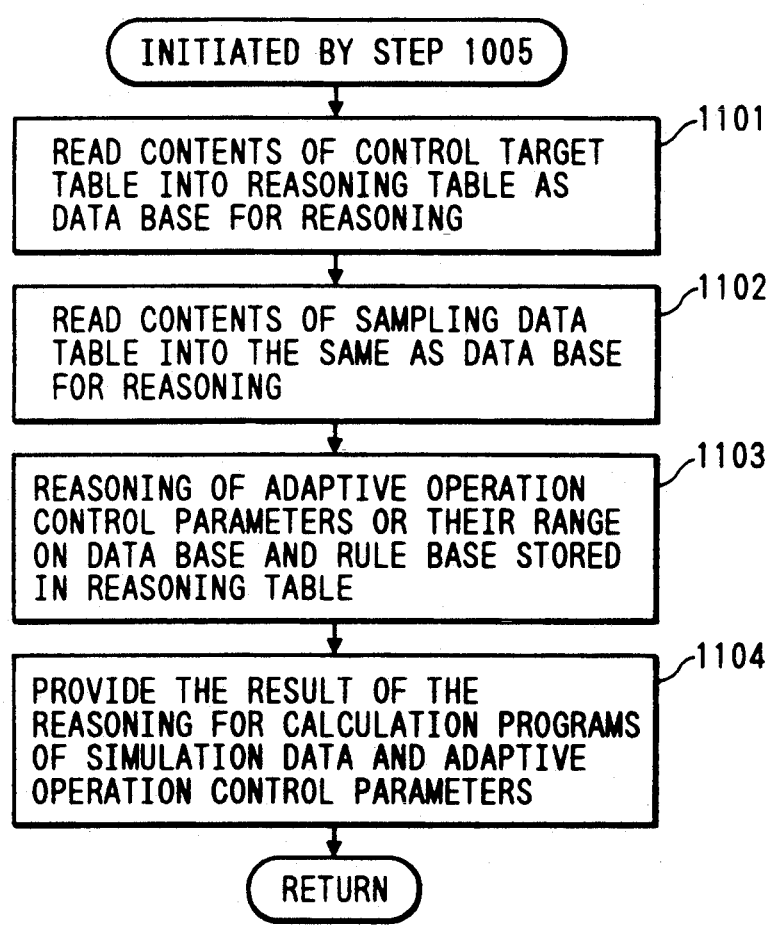
FIG. 11 is a flow chart illustrating a reasoning program, which is also one of the programs included in the simulation software of FIG. 2b.

FIG. 11 shows a flow of this reasoning program SF211. This program SF211 is initiated at step 1005 of the program SF203 (cf. FIG. 10) and infers the range of control parameters to be simulated and the procedure of the simulation.

At steps 1101 and 1102, contents of the control target table SF209 and the sampling data table SF202 are read into the reasoning table SF212 as the data base for the reasoning, respectively. Thereafter, the processing operation goes to step 1103, at which the reasoning is carried out by using knowledge stored in advance in the reasoning table SF212 as the rule base on the basis of the data just read into the same table.

As the result of this reasoning, the control parameters, their range to be simulated and the procedure of the simulation are inferred. Further, the rule base used in this reasoning will be explained in detail later.

Then, at step 1104, the thus obtained control parameters, their range to be simulated and the procedure of the simulation are supplied to both the simulation data calculating program SF203 and the adaptive operation control parameter calculating program SF208. Thereafter, the processing operation returns to the simulation data calculating program SF203 (cf. FIG. 10).

3.2.4 Characteristic Curve Calculating Program SF206

Figure 12:
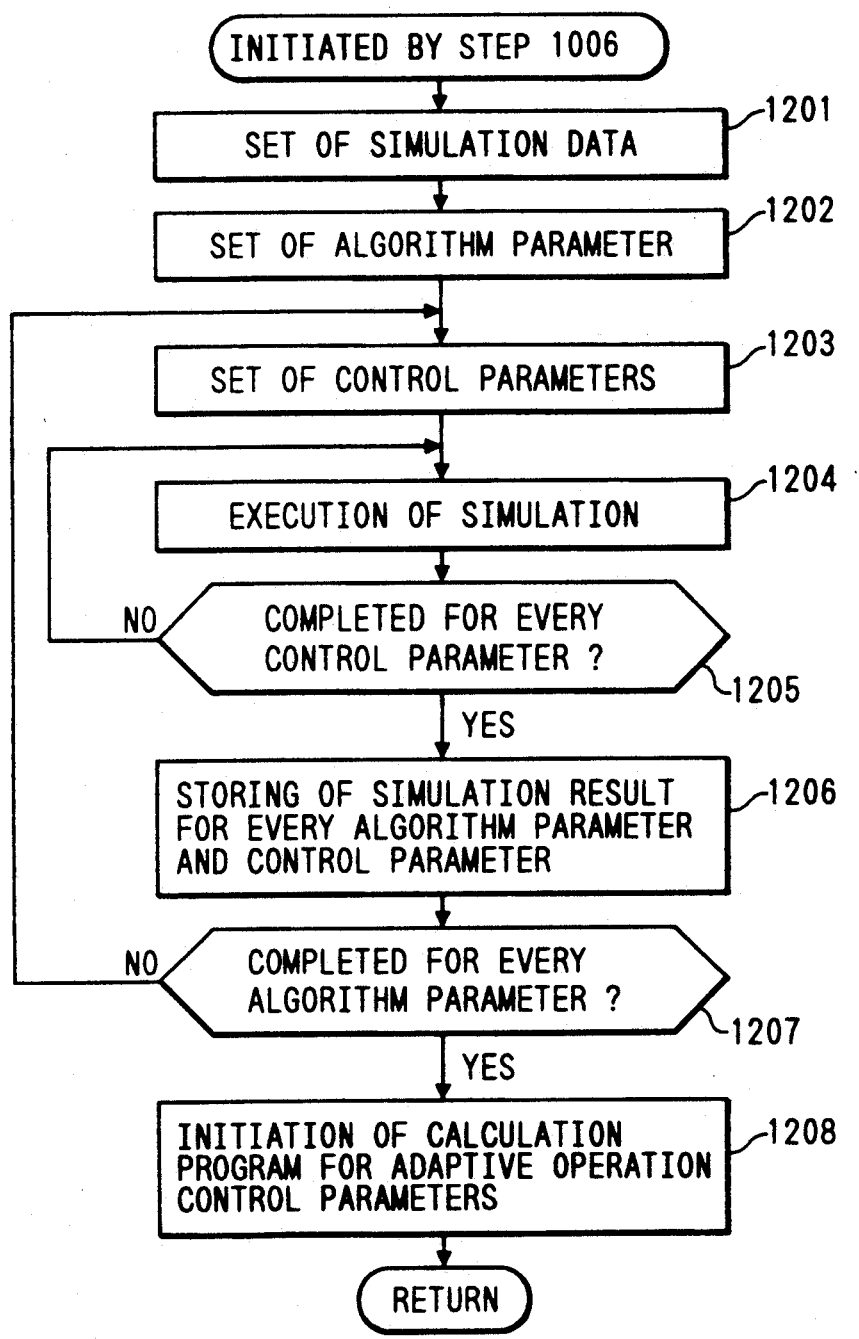
FIG. 12 is a flow chart illustrating a characteristic curve calculating program, which is also one of the programs included in the simulation software of FIG. 2b.

A flow of the characteristic curve calculating program SF206 is as shown in FIG. 12. This program SF206 is initiated at step 1006 of the simulation data calculating program SF203 (cf. FIG. 10).

This program SF206 carries out the simulation with respect to various control parameters such as the algorithm selection parameter $A_s$, the control parameter $\alpha$, the control parameters for the waiting time and the riding time and the threshold of the cage-load factor in accordance with the range of control parameters and the procedure of the simulation inferred by the reasoning program SF211. Further, the aforesaid threshold of the cage-load factor can be also considered as one of the control parameters.

At first, at step 1201, the data for simulation such as $C_{ij}(pre)$, $t_r(pre)$ and $t_s(pre)$ are set, and then at step 1202, the algorithm parameter $A_s$ is set. Further, steps 1202 and 1207 indicates that the processing operation described below constitutes a loop operation and is repeated for every algorithm parameter $A_s$, i.e., 1, 2 and 3 in this case (cf. FIG. 6). Namely, when $A_s=1$ is set, the allotment algorithm 1 is selected and this loop operation is carried out accordingly; similarly, when $A_s=2$ and 3, the allotment algorithm 2 or 3 is selected, respectively, and this loop operation is repeated in accordance with the allotment algorithm selected.

After the algorithm parameter $A_s$ is set, the control parameters are set at step 1203 and the simulation is executed at step 1204. As apparent from step 1205, this simulation is repeatedly executed until it is completed for every control parameter. With respect to the control parameter $\alpha$, the simulation is repeatedly executed with the value of the parameter o changed as 1, 2, 3, 4 and 5, for example.

After the simulation is completed for every value of every control parameter, the results thereof are stored in the adaptive operation control parameter table SF210 at step 1206. Thus obtained data constitute characteristic curves for corresponding control parameters, such as a characteristic curve of the cage-load factor versus the threshold thereof, a characteristic curve of the riding time versus the control parameter thereof, and so on, which will be further described later.

Then, if it is judged at step 1207 that the simulation is completed for every algorithm parameter, the adaptive operation control parameter calculating program SF208 is initiated at step 1208. When the execution of the program SF208 is completed, the processing operation of this program returns to the program SF203 (cf. FIG. 10)

3.2.5 Simulation Program

Figure 13A:
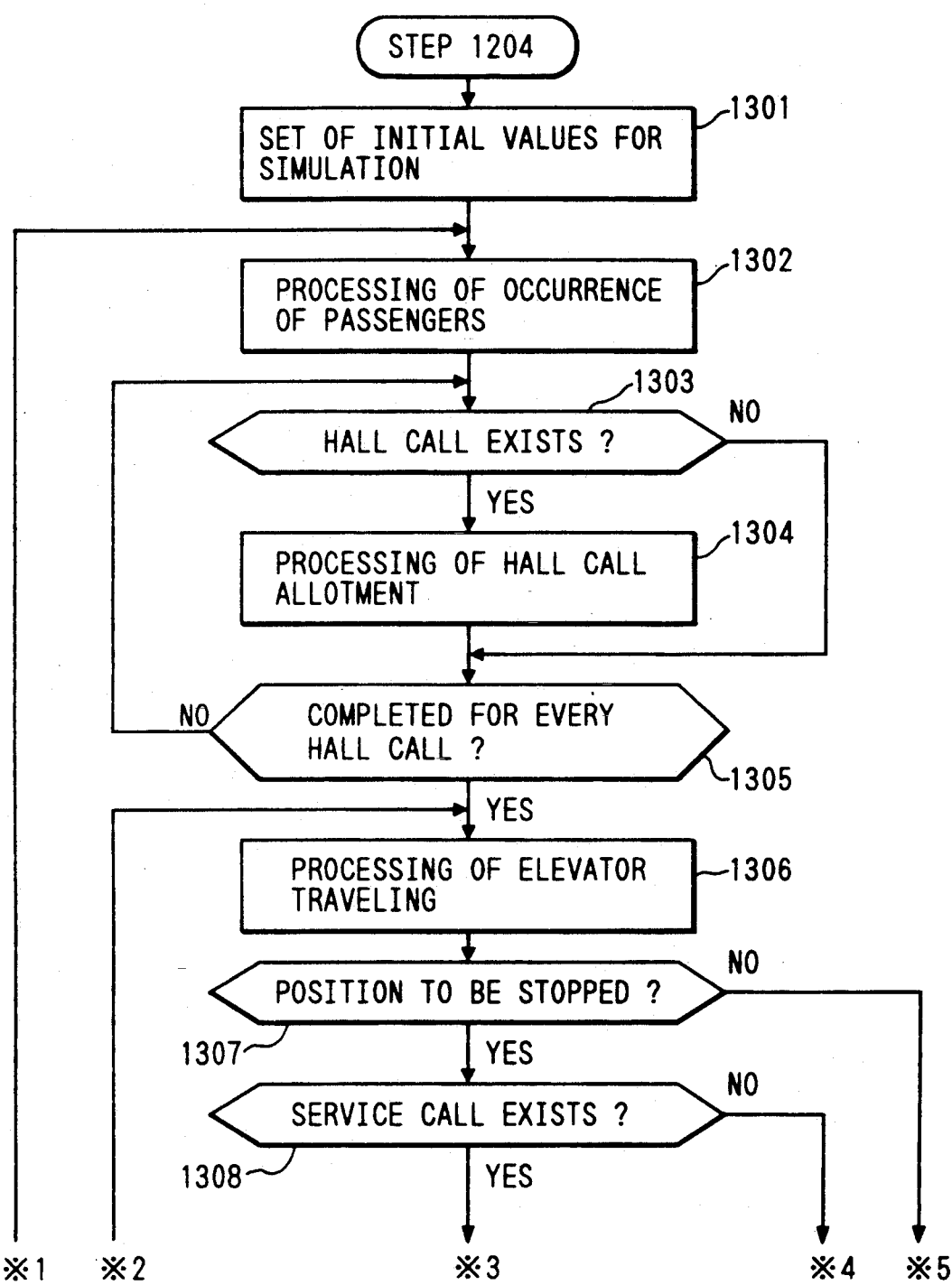
FIGS. 13a and 13b are flow charts illustrating a subroutine program for executing the simulation, which is executed in course of the execution of the characteristic curve calculating program of FIG. 12.
Figure 13B:
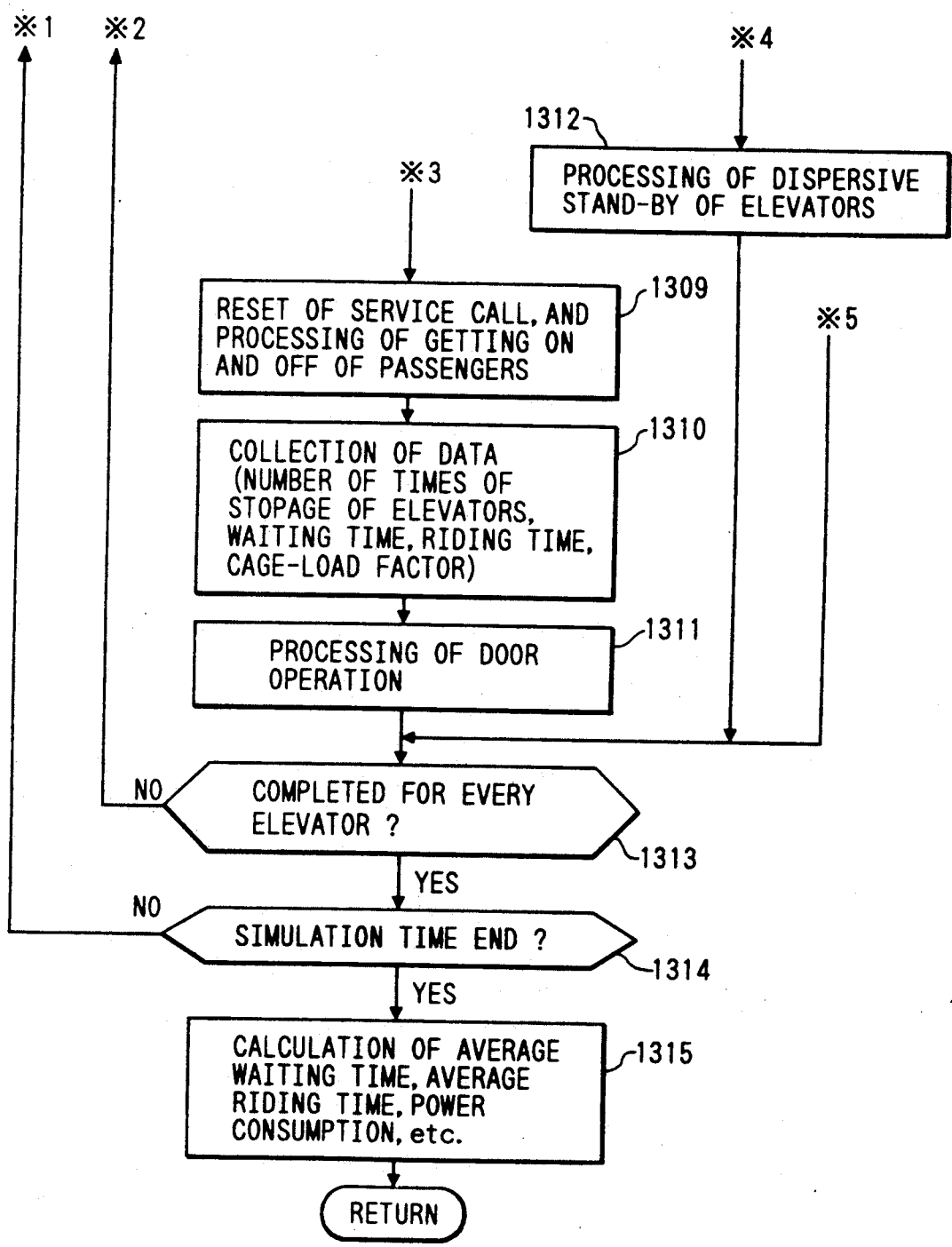

In the following, the simulation program executed at step 1204 of the program SF206 will be explained, referring to FIGS. 13a and 13b.

The simulation program mainly comprises programs for an operation of an elevator itself, such as a traveling operation program, a door operation (open/close) program, a passenger getting on/off processing program, etc., and management programs for effectively controlling plural elevators, such as a call allotment program, an elevator dispersive stand-by program and so on. This simulation program must be constructed equivalently to the actual operation of an elevator system as much as possible, because the accuracy of the control parameters obtained greatly depends on how faithfully this program can simulate the actual operation of an elevator system. FIGS. 13a and 13b show one example of such a program.

As already stated, the simulation program is initiated at step 1204 of the characteristic curve calculating program SF206 (cf. FIG. 12). Now, at step 1301 in FIG. 13a, the preparation for the simulation is carried out. Namely, initial values of various variables, such as a number of elevators to be group-controlled, positions (floors) of the elevators, a provisional number of passengers of respective cages of the elevators and so on, are set.

Then, at step 1302, the processing operation is executed with respect to the occurrence of users of elevators. To this end, the predictive destination-traffic demand $C_{ij}(pre)$ already obtained is used. At that time, random numbers can be further taken into consideration, because the occurrence of users concerns a matter of probability.

Next, it is discriminated at step 1303 whether or not a hall call exists in a corresponding floor. If there is no hall call, the processing operation jumps to step 1305. Otherwise, at step 1304, the processing operation of the hall call allotment is carried out in accordance with the same hall call allotment program selected in FIG. 6. This hall call allotment processing is repeated by step 1305, until it is completed for every hall call then existing.

After that, the processing operation shifts to the processing for simulating the actual operation of the elevators. Namely, at first, the traveling of an elevator is simulated at step 1306, and then it is discriminated at step 1307 whether or not a current position of the elevator is a position (floor) to be stopped. If it is a negative answer, the processing operation jumps to step 1313 (FIG. 13b).

Otherwise, the processing operation of steps 1308 to 1312 is executed. Namely, it is discriminated at step 1308 whether or not there exists a service call at a corresponding floor, such as a cage call or an already allotted hall call. If there is no service call, the processing of the dispersive stand-by of elevators is carried out at step 1312.

If a service call exists, the processing operation goes to step 1309, at which the service call is reset and the processing operation for the getting on and off of users or passengers is executed. This processing operation is achieved by adding a number of passengers within an elevator cage at the time of arrival at a corresponding floor and a number of users getting on the elevator at the floor and then subtracting a number of passengers getting off the elevator at the floor from the sum of the above addition. The number of passengers or users, as described above, can be known by an output of a cage-load detector and the already described $C_{ij}(pre)$.

Thereafter, at step 1310, there are collected various data, such as a number of times of stoppage of an elevator, a waiting time, a riding time and a cage-load factor, for the purpose of evaluating the result of the simulation. Of those data, the number of times of stoppage of the elevators are collected to evaluate the power consumption, because the power consumption is almost in proportion to that number.

Then, at step 1311, the processing operation for the door open and close is executed and the processing operation for one elevator is completed. If it is judged at step 1313 that the processing operation as mentioned above is not yet completed for every elevator, the processing operation returns back to step 1306 and the same processing operation as mentioned above is repeated for another elevator.

If, at step 1313, the aforesaid processing operation is judged to be completed for every elevator, it is discriminated at step 1314 whether or not a predetermined simulation time, which is set, for example, to 5 to 30 minutes according an elevator system, ends. If the simulation time has not ended yet, the processing operation returns back to step 1302 and the same processing operation is, repeated for every elevator until the simulation time ends.

If it is judged that the simulation time is over, the processing operation goes to step 1315, at which an average waiting time, an average riding time, a power consumption etc., which are used as control targets, are calculated on the basis of the data collected at step 1310, and then the processing operation returns to the characteristic curve calculating program SF206 (cf. step 1206 in FIG. 12).

3.2.6 Adaptive Operation Control Parameter Calculating Program SF208

Figure 14:
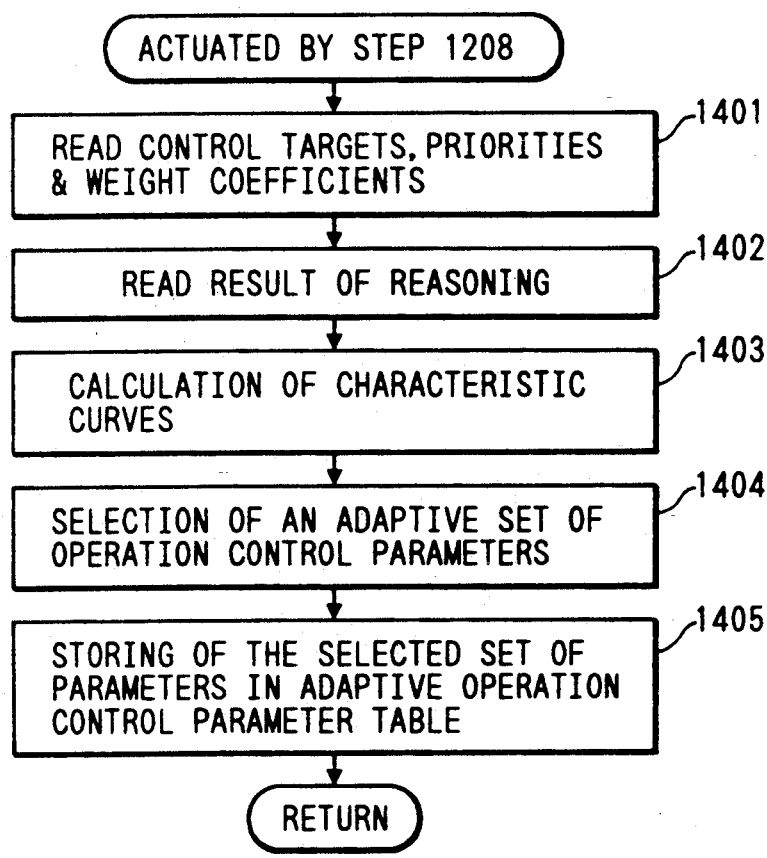
FIG. 14 is a flow chart illustrating an adaptive operation control parameter calculating program, which is also one of the programs included in the simulation software of FIG. 2b.

Referring next to FIG. 14, the adaptive operation control parameter calculating program SF208 will be explained in the following. This program SF208 is initiated at step 1208 of the characteristic curve calculating program SF206 (cf. FIG. 12).

This program SF208 is a program for obtaining the adaptive control parameters most suited for the management and control of the plural elevators on the basis of data for the characteristic curves of the waiting time, the riding time, the cage-load factor and the power consumption, as well as data supplied by the control target setting apparatus PD and stored in the control target table SF209.

At first, the control targets and their weight coefficients are read at step 1401, and then the result of the reasoning is read at step 1402. At step 1403, the data for the characteristic curve are interpolated by an arbitrary interpolation method, whereby further fine data for the control targets can be provided.

Then, an evaluation value $\gamma$ is calculated in accordance with a predetermined evaluation function within the range of control parameters, which is inferred by the reasoning program SF211. For example, such an evaluation function is expressed as follows:

$$\gamma = a_1(W_t - W_{to}) + a_2(R_t - R_{to})$$

wherein $a_1$, $a_2$; weight coefficients;
$W_t$, $W_{to}$; a simulated value and a target value of the waiting time; and
$R_t$, $R_{to}$; a simulated value and a target value of the riding time.

Although in the example of the evaluation function as described above, only two control items are taken into consideration, it is of course possible to incorporate further control items by adding the third term, the fourth term and so on corresponding to necessary control items in the right side of the above equation.

At step 1404, a set of control parameters, which make the evaluation value calculated above a minimum, are selected. The thus selected set of control parameters are stored in the adaptive operation control parameter table SF210 at step 1405, and then this processing operation returns to the characteristic curve calculating program SF206 (cf. FIG. 12).

IV Operating Mechanism of The Reasoning

Before explaining the operating mechanism of the reasoning, examples of contents of the data base and the rule base in the reasoning table SF212 are shown in FIGS. 15 and 16, respectively.

As shown in FIG. 15, there are two kinds of reasoning data, i.e., data as shown as #1 to #6 in the figure, which are collected by the data collecting program SF201 and read therein from the sampling data table SF202, and data as shown as #n to #(n+5), which are read therein from the control target table SF209.

FIG. 16 shows an example of part of the rules used in the reasoning. As the rules, there are the following, for example;

Rule 1
IF the traffic demand increases, and the cage-load factor is stressed,
THEN a threshold of the cage-load factor is made small.

Rule 2
IF the traffic demand between floors increases, and the riding time is stressed,
THEN the control parameter of the riding time is made large.

Rule 3
IF the downward traffic demand is large, and the cage-load factor is stressed,
THEN a threshold of the cage-load factor is to be determined at first.

Rule 4
IF the downward traffic demand is large, and the waiting time is stressed,
THEN a threshold of the cage-load factor is made large.

Rule 5
IF a present time period is a usual period, and the waiting time is stressed,
THEN a threshold and a range of the cage-load factor is made large.

FIG. 16 shows the first three rules among the foregoing. Many kinds of the reasoning rules can be provided in advance experimentally or empirically.

A rule to be used for the reasoning is determined on the basis of the state of use of an elevator system, such as the traffic demand and its increment or difference, obtained by using the data stored in the sampling data table SF202 and the contents of the control target table SF209. Namely, a rule, a condition part of which agrees with the aforesaid state of use and the contents of the table SF202, is at first selected, and then the range of control parameter to be simulated and/or the procedure of the simulation are determined in accordance with a conclusion of the selected rule.

Figure 18:
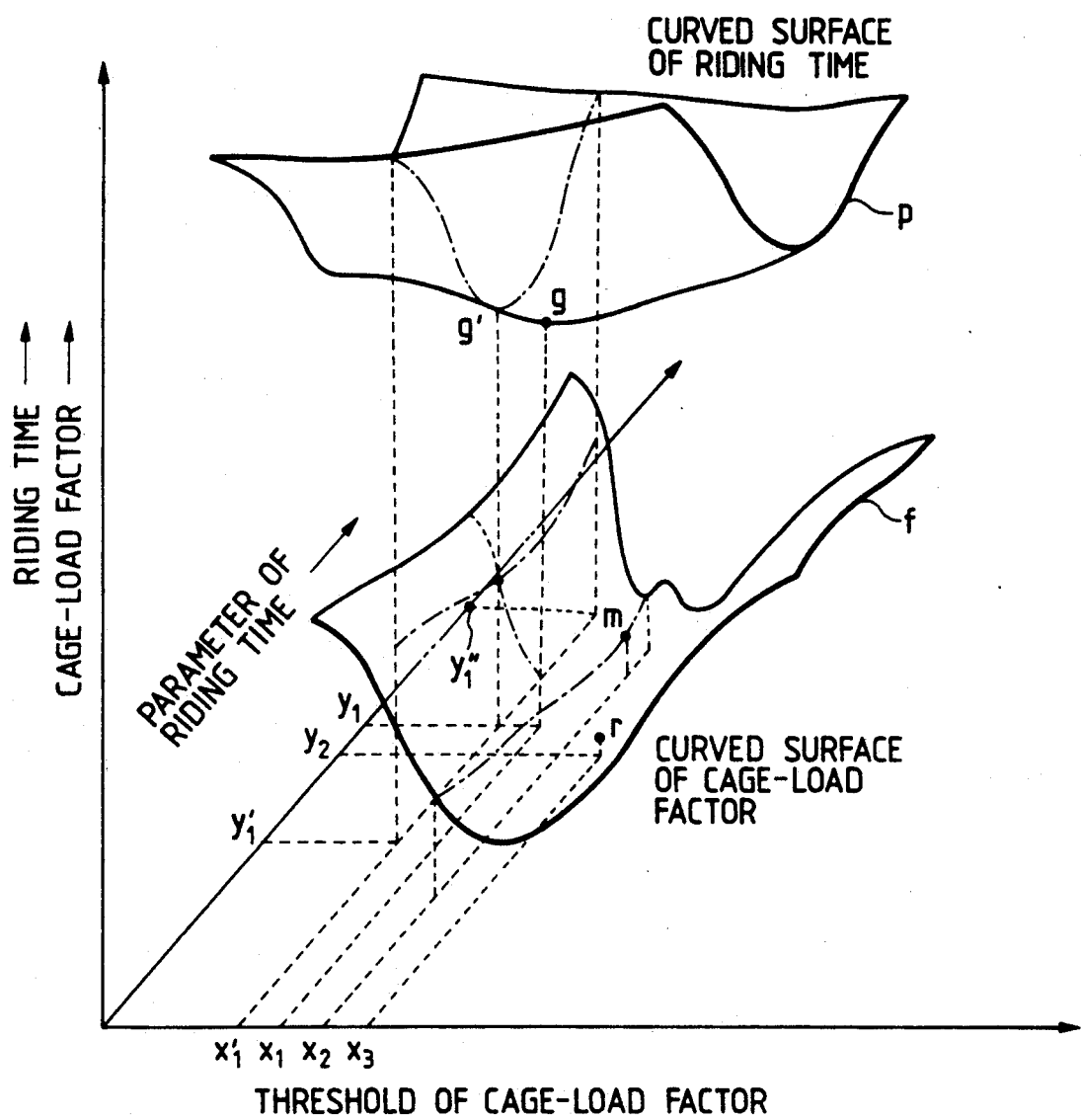
FIG. 18 is an explanatory drawing showing characteristic curved surfaces of a riding time and a cage-load factor defined by a control parameter of the riding time and a threshold of the cage-load factor, which is also used for explaining operating mechanism of another rule for the reasoning operation.

Referring next to FIGS. 17 and 18, the operating mechanism of the reasoning will be explained. FIG. 17 is a drawing for explaining the reasoning mechanism by the rule 1 as shown in FIG. 16.

In the figure, a curve A is a curve of the cage-load factor for the traffic demand of 120 persons/5 min. with respect to its threshold under a certain state of use. A point a on this curve A indicates a set value of the cage-load factor and a point c a threshold of the cage-load factor with which the set value a of the cage-load factor can be met under the same traffic demand. A curve B is a curve of the cage-load factor for the traffic demand of 150 persons/5 min. with respect to its threshold under the same state of use as above.

In order that an elevator system is controlled, putting the importance on the cage-load factor, the control must be carried out so as to meet the set value of the cage-load factor. If, however, though the traffic demand is changed from 120 persons/5 min. to 150 persons/5 min., the threshold of the cage-load factor is maintained at the point c, the cage-load factor greatly increases as indicated by a point e on the curve B.

Then, in order to meet the set value of the cage-load factor, it is necessary to make the threshold of the cage-load factor small as shown by a point d. As a result, the cage-load factor can be suppressed to the value as shown by a point b, which is almost equal to the value corresponding to the point a on the curve A.

As described above, even when the traffic demand increases, the cage-load factor can be maintained at a set value, if only the threshold thereof decreases commensurately to the increment of the traffic demand. Therefore, the range of the threshold of the cage-load factor, for which the simulation must be carried out, is narrowed.

In the example as shown, the simulation is sufficient to be carried out with respect to the range of the threshold of the cage-load factor, which is smaller than that corresponding to the point d. Namely, the range of the threshold is limited, with the result that a number of times of the simulation is remarkably reduced.

In the following, the example of the reasoning rule 3 will be explained, referring to FIG. 18. In the figure, a curved surface p indicates the change in the riding time when a control parameter of the riding time and a threshold of the cage-load factor are changed under a certain state of use of an elevator system, and a curved surface f indicates the change in the cage-load factor when a control parameter of the riding time and a threshold of the cage-load factor are changed under the same state of use as above.

Usually, when plural parameters are concerned, the simulation is at first carried out for one of the parameters with the remaining parameters maintained at arbitrarily fixed values, whereby an adaptive value of the one parameter is found. Then, the simulation is carried out for a second parameter with the first parameter and the remaining ones maintained at the adaptive value and the arbitrary values, respectively, whereby an adaptive value of the second parameter is found. The simulation as mentioned above is repeated until an adaptive value is found for every parameter, with the result that a number of times of simulation can be reduced as a whole.

Accordingly, in the case where, as shown in FIG. 18, the curved surface p of the riding time is defined by two parameters of the threshold of the cage-load factor and the control parameter of the riding time, the simulation for obtaining a point g, at which the riding time is made minimum, is carried out in the following manner.

At first, the simulation is carried out with a control parameter of the riding time changed under an arbitrarily fixed threshold $x_1'$ of the cage-load factor, whereby a point g' of the minimum riding time under the threshold $x_1'$ is found. Then, the simulation is carried out with the threshold of the cage-load factor changed under the control parameter of the riding time fixed at $y_1$ corresponding to the point g', whereby a point g, at which the minimum riding time as a whole can be achieved, is found.

If, however, the simulation is carried out in the same order as described above, even in the case where the importance is to be put on the cage-load factor, a point m, for example, at which the local minimum, not the minimum as a whole, of the cage-load factor is achieved, happens to be found by changing at first the control parameter of the riding time with the threshold fixed at a given value $x_2$. Namely, it becomes impossible to find a point r, at which the minimum cage-load factor as a whole is achieved.

In such case, according to this embodiment, the simulation is carried out in accordance with the procedure determined in the rule 3 as mentioned above. As a result, a threshold of the cage-load factor is at first changed to thereby obtain an adaptive value $x_3$ of the threshold of the cage-load factor, and then a control parameter of the riding time is changed to thereby obtain an adaptive value $y_2$ of the control parameter of the riding time.

In this manner, a really adaptive value of every parameter can be always obtained by altering the procedure of the simulation in accordance with the state of use of an elevator system and control targets, even if one of control parameters is fixed and another control parameter is changed one after another to obtain an adaptive value of the control parameters with the possibly reduced number of times of the simulation.

The rules for reasoning, as describe above, have to be provided for every elevator system, because they are different in accordance with the condition of use of an elevator system, such as a kind of a building installed with the elevator system, a traffic demand for the elevator system, a position (floor) of a base floor, etc. The aforesaid rules, three of which are shown in FIG. 16, are examples from among reasoning rules which were formulated by processing about three thousand different cases statistically.

V. Another Embodiment and Variation

Figure 19:
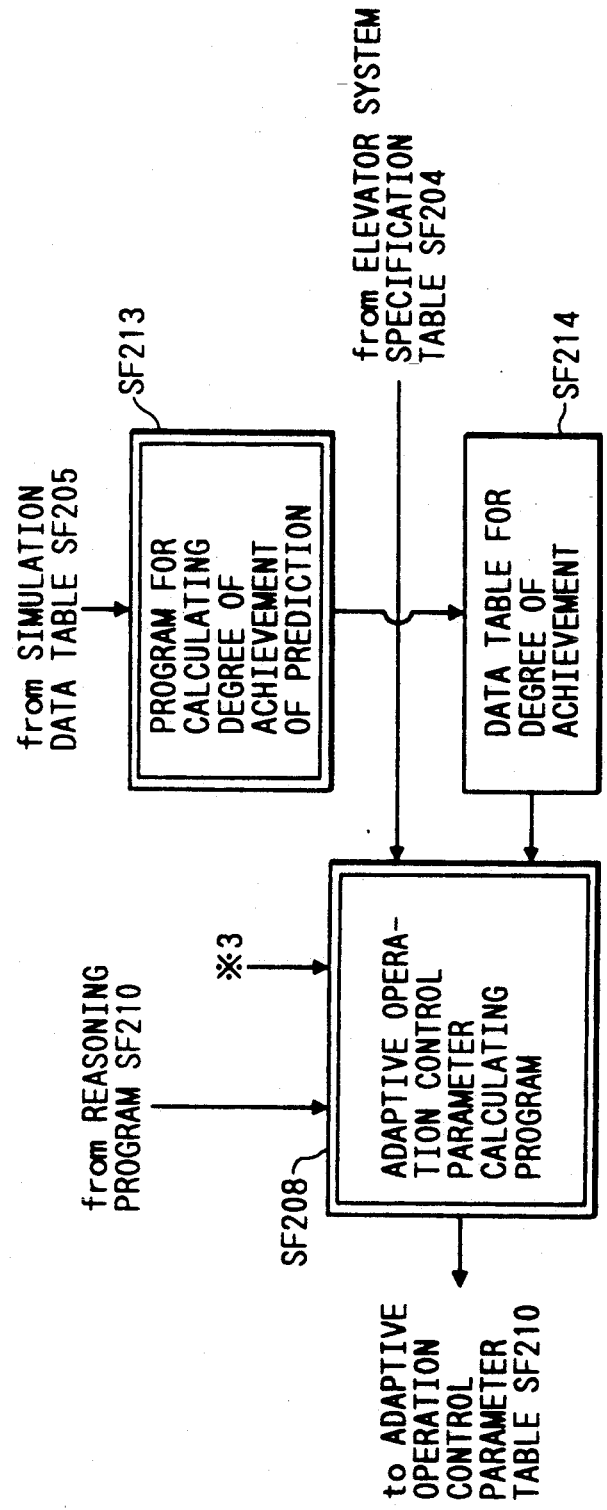
FIG. 19 is a block diagram schematically showing a part of a software configuration according to another embodiment of the present invention, which is executed by the group-management control apparatus of FIG. 1.

FIG. 19 is a block diagram of a software configuration according to another embodiment of the present invention, however the figure shows only a part thereof, especially of the simulation software. Remaining parts of this embodiment are the same as corresponding parts in the software configuration shown in FIG. 2b. Further, same reference symbols denote same parts as in FIG. 2b.

As apparent from the figure, there are provided a program SF213 for calculating the degree of achievement of predictive control target or targets and a table SF214 for storing the result of the execution of the program SF213, substituted for the characteristic curve calculating program SF206 and its table SF207 in FIG. 2b.

Therefore, according to this embodiment, the adaptive control parameters are not calculated from the various characteristic curves provided by the program SF206, but can be obtained directly from the result of the simulation without any calculation for the characteristic curves.

The program SF213 is almost the same as the characteristic curve calculating program SF206 with a small difference. This program SF213 provides, with respect to every control target, the degree of achievement of a predicted control target as a ratio of a value of a control target obtained by the simulation to a predictive value of the control target.

This embodiment is especially advantageous in the case where a control target or targets are fixed, because a number of times of the simulation is reduced. Further, there is no need to obtain fine data by interpolating data of the characteristic curves (cf. step 1403 of FIG. 14). Therefore, a time necessary for the processing operation will be shortened.

Further, in the foregoing description of the embodiments, as the control item or target, the waiting time, the riding time and the cage-load factor were referred to. In the present invention, however, the control item or target is not limited to those three, but there are some options thereof.

All control items or targets as described below can be included in an evaluation function included in a hall call allotment algorithm as evaluation indexes. Namely, in such an evaluation function one or more control items or targets as described below can be added to or substituted for the three control targets already described.

At first, a rate of long-waiting can be used. This rate is indicated as a rate of a number of hall calls of the long-waiting to a total number of hall calls for a predetermined time period, e.g., one hour. A changing rate of a reserved elevator is also available. This is a rate of hall calls, the allotment of which is changed from an elevator to another elevator, which can be indicated by a rate of a number of such hall calls to a total number of calls for one hour, for example.

Further, a transportation capacity, which means a number of persons capable of being transported for a predetermined time, can be used. In an elevator system with plural elevators, this is indicated as a number of elevators ready for the service operation. In such an elevator system, a number of passengers for every elevator can be used, too. There can be also used a time of information of a reserved elevator, which is a time from the registration of a hall call of a certain floor to the reservation of an elevator for serving the certain floor.

A rate of first-arriving elevators can be used, too. This is a rate of a number of hall calls served by elevators other than reserved elevators to a total number of hall calls for a predetermined time period. There is also available a number of passing-by elevators, which indicates a number of times that elevators other than a reserved elevator passes by a floor, at which a hall call is generated.

As still another option of the control target, an amount of general information announced for waiting persons at an elevator hall can be used. Such general information includes events taking place in a building installed with an elevator system, weather forecast, time signal and so on. Although there is no unit widely used for representing this amount, a product of a number of kinds of the information and a number of times of announcement for a unit time may be employed.

A rate of saving power consumption can be also used for the control target. The consumed electric power greatly depends on a number of times of repetition of start and stop of elevators. Therefore, this is represented by a reduction rate of the number of times of start and stop of elevators.

We claim:

1. A group-management control method for an elevator system with plural elevators capable of serving plural floors, in which hall calls generated on the floors are allotted to adaptive elevators in accordance with a predetermined hall call allotment algorithm so that a desired control target or targets requested by an operator are achieved, comprising the steps of:

providing plural kinds of the predetermined hall call allotment algorithm in advance, each allotment algorithm having a particular evaluation function including evaluation indexes of control targets and variable control parameters associated with the respective evaluation indexes, the control parameters being determined on the basis of a result of simulating a service operation of the elevators using each allotment algorithm; and selecting one of the plural kinds of the predetermined hall call allotment algorithm by performing a reasoning operation executed in accordance with a reasoning rule selected form among a plurality of reasoning rules empirically provided in advance on the basis of the desired control target or targets and an operating state of the elevators; and dispatching elevators to serve hall calls as determined by said select predetermined hall call allotment algorithm.

2. A method according to claim 1, wherein a procedure of the simulation is determined by a reasoning operation executed in accordance with a reasoning rule selected from among the plurality of reasoning rules on the basis of the desired control target or targets and the operating state of the elevators.

3. A method according to claim 1, wherein a range of each control parameter is determined by a reasoning operation executed in accordance with a reasoning rule selected from among the plurality of reasoning rules on the basis of the desired control target or targets and the operating state of the elevators.

4. A method according to claim 1, wherein a procedure of the simulation and a range of each control parameter are determined by a reasoning operation executed in accordance with a reasoning rule selected from among the plurality of reasoning rules on the basis of the desired control target or targets and the operating state of the elevators.

5. A method according to any one of claims 1 and 2-4, wherein the control target or targets are at least two control targets selected from among a plurality of control targets including a waiting time, a riding time, and a cage-load factor.

6. A method according to claim 5, wherein the plurality of control targets further include a rate of long-waiting, a changing rate of a reserved elevator, a transportation capacity, a number of passengers, a time of information of a reserved elevator, a rate of first-arriving elevators, a number of passing-by elevators, an amount of general information at elevator halls, and a rate of saving power consumption.

7. A group-management control apparatus for an elevator system with plural elevators capable of serving plural floors, comprising:
hall call devices provided in respective elevator halls on respective floors for generating respective hall calls;
individual elevator control means provided for respective elevators, each of the individual elevator control means individually controlling a service operation of a respective elevator in response to an operation instruction supplied thereto; and
group-management control means for allotting the hall calls to adaptive elevators in accordance with a predetermined hall call allotment algorithm and supplying respective operation instructions to the individual elevator control means in accordance with the allotted hall calls so that a desired control target or targets requested by an operator are achieved;
wherein said group-management control means includes a processor which provides plural kinds of the predetermined hall call allotment algorithm in advance, each allotment algorithm having a particular evaluation function including evaluation indexes of control targets and variable control parameters associated with the respective indexes, the control parameters being determined on the basis of a result of simulating a service operation of the elevators using each allotment algorithm, wherein the processor selects one of the plural kinds of the predetermined hall call allotment algorithm by performing a reasoning operation in accordance with a reasoning rule selected from among a plurality of reasoning rules empirically provided in advance on the basis of the desired control target or targets and an operating state of the elevators.

8. An apparatus according to claim 7, wherein a procedure of the simulation is determined by a reasoning operation executed in accordance with a reasoning rule selected from among the plurality of reasoning rules on the basis of the desired control target or targets and the operating state of the elevators.

9. An apparatus according to claim 7, wherein a range of each control parameter is determined by a reasoning operation executed in accordance with a reasoning rule selected from among the plurality of reasoning rules on the basis of the desired control target or targets and the operating state of the elevators.

10. An apparatus according to claim 7, wherein a procedure of the simulation and a range of each control parameter are determined by a reasoning operation executed in accordance with a reasoning rule selected form among the plurality of reasoning rules on the basis of the desired control target or targets and the operating state of the elevators.

* * * * *